(12) United States Patent
McQuade et al.

(10) Patent No.: US 7,905,245 B2
(45) Date of Patent: Mar. 15, 2011

(54) DOSING CONTROL SYSTEM AND METHOD

(75) Inventors: Brett T. McQuade, Bradenton, FL (US); David L. Morano, Sarasota, FL (US)

(73) Assignee: Siemens Water Technologies Corp., Warrendale, PA (US)

( * ) Notice: Subject to any disclaimer, the term of this patent is extended or adjusted under 35 U.S.C. 154(b) by 632 days.

(21) Appl. No.: 11/542,649

(22) Filed: Oct. 2, 2006

(65) Prior Publication Data
US 2007/0074758 A1   Apr. 5, 2007

Related U.S. Application Data

(60) Provisional application No. 60/722,200, filed on Sep. 30, 2005.

(51) Int. Cl.
*B01D 17/12* (2006.01)
(52) U.S. Cl. ............................ 137/88; 137/93
(58) Field of Classification Search ............... 137/87.01, 137/88, 93; 210/739, 743, 749
See application file for complete search history.

(56) References Cited

U.S. PATENT DOCUMENTS

| | | |
|---|---|---|
| 2,289,589 A | 7/1942 | Pomeroy |
| 3,351,542 A | 11/1967 | Oldershaw et al. |
| 3,458,414 A | 7/1969 | Crane et al. |
| 3,669,857 A | 6/1972 | Kirkham et al. |
| 3,733,266 A | 5/1973 | Bishop et al. |
| 3,870,631 A | 3/1975 | Fassell et al. |
| 4,033,871 A | 7/1977 | Wall |
| 4,053,403 A | 10/1977 | Bachhofer et al. |
| 4,056,469 A | 11/1977 | Eichenhofer et al. |
| 4,087,360 A | 5/1978 | Faust et al. |
| 4,129,493 A | 12/1978 | Tighe et al. |
| 4,136,005 A | 1/1979 | Persson et al. |
| 4,137,166 A | 1/1979 | Heimberger et al. |
| 4,149,952 A | 4/1979 | Sato et al. |
| 4,224,154 A | 9/1980 | Steininger |
| 4,256,552 A | 3/1981 | Sweeney |
| 4,263,119 A | 4/1981 | Mose et al. |
| 4,323,092 A | 4/1982 | Zabel |
| 4,340,489 A | 7/1982 | Adams et al. |
| 4,366,064 A | 12/1982 | Mihelic et al. |
| 4,381,240 A | 4/1983 | Russell |
| 4,384,961 A | 5/1983 | Abrams et al. |
| 4,385,973 A | 5/1983 | Reis et al. |

(Continued)

FOREIGN PATENT DOCUMENTS
CA        1079423        6/1980
(Continued)

OTHER PUBLICATIONS

U.S. Filter/Stranco, "Strantrol® MG/L5 Controler," Data Sheet (2004).

(Continued)

*Primary Examiner* — John Fox

(57) ABSTRACT

A method and system of controlling addition of a treating agent based on a control function comprising a plurality of demand values is disclosed. Process parameters of a fluid to be treated are measured and one or more control signals are generated based on the measured process values and the control function. The control signals are used to actuate a treating agent dosing system and also used to monitor and compare the levels, status or condition of the treating agent. Additional features of the invention compensate for rain events.

20 Claims, 15 Drawing Sheets

U.S. PATENT DOCUMENTS

| | | | |
|---|---|---|---|
| 4,393,037 | A | 7/1983 | Delaney et al. |
| 4,409,074 | A | 10/1983 | Iijima et al. |
| 4,432,860 | A | 2/1984 | Bachot et al. |
| 4,435,291 | A | 3/1984 | Matsko |
| 4,446,031 | A | 5/1984 | List |
| 4,456,512 | A | 6/1984 | Bieler et al. |
| 4,496,452 | A | 1/1985 | Bianchi |
| 4,508,697 | A | 4/1985 | Burrus |
| 4,550,011 | A | 10/1985 | McCollum |
| 4,574,037 | A | 3/1986 | Samejima et al. |
| 4,599,159 | A | 7/1986 | Hilbig |
| 4,627,897 | A | 12/1986 | Tetzlaff et al. |
| 4,631,530 | A * | 12/1986 | Gasper ............ 340/679 |
| 4,681,687 | A | 7/1987 | Mouche et al. |
| 4,767,511 | A | 8/1988 | Aragon |
| 4,818,412 | A | 4/1989 | Conlan |
| 4,952,376 | A | 8/1990 | Peterson |
| 4,990,260 | A | 2/1991 | Pisani |
| 5,045,213 | A | 9/1991 | Bowers |
| 5,200,092 | A | 4/1993 | Richards et al. |
| 5,230,822 | A | 7/1993 | Kamel et al. |
| 5,302,356 | A | 4/1994 | Shadman et al. |
| 5,336,431 | A | 8/1994 | Richards et al. |
| 5,348,664 | A | 9/1994 | Kim et al. |
| 5,348,665 | A | 9/1994 | Schultz et al. |
| 5,422,014 | A | 6/1995 | Allen et al. |
| 5,470,480 | A | 11/1995 | Gray et al. |
| 5,500,368 | A | 3/1996 | Tatnall |
| 5,516,423 | A * | 5/1996 | Conoby et al. ............ 210/85 |
| 5,518,629 | A | 5/1996 | Perez et al. |
| 5,587,069 | A | 12/1996 | Downey et al. |
| 5,639,476 | A | 6/1997 | Osblack et al. |
| 5,641,410 | A * | 6/1997 | Peltzer ............ 210/739 |
| 5,779,912 | A | 7/1998 | Gonzalez-Martin et al. |
| 5,985,155 | A | 11/1999 | Maitland |
| 6,284,144 | B1 | 9/2001 | Itzhak |
| 6,309,597 | B1 | 10/2001 | Ballinger, Jr. et al. |
| 6,409,926 | B1 | 6/2002 | Martin |
| 6,503,464 | B1 | 1/2003 | Miki et al. |
| 6,535,795 | B1 | 3/2003 | Schroeder et al. |
| 6,576,144 | B1 | 6/2003 | Vineyard |
| 6,620,315 | B2 | 9/2003 | Martin |
| 6,623,647 | B2 | 9/2003 | Martin |
| 6,716,359 | B1 | 4/2004 | Dennis |
| 6,991,735 | B2 | 1/2006 | Martin |
| 7,087,172 | B2 | 8/2006 | Hunniford et al. |
| 7,108,781 | B2 | 9/2006 | Martin |
| 7,138,049 | B2 | 11/2006 | Hunniford et al. |
| 2004/0112838 | A1 | 6/2004 | Martin |
| 2005/0224409 | A1 | 10/2005 | Harshman et al. |
| 2006/0169646 | A1 | 8/2006 | Andree et al. |

FOREIGN PATENT DOCUMENTS

| | | |
|---|---|---|
| DE | 19844179 | 3/2000 |
| GB | 2027004 | 2/1980 |
| GB | 2281742 | 3/1995 |
| JP | 60202792 | 10/1985 |
| JP | 11-033542 | 2/1999 |
| JP | 11057752 | 3/1999 |
| JP | 11290878 | 10/1999 |

OTHER PUBLICATIONS

U.S. Filter/Wallace & Tiernan, "Multi Function Analysers DEPOLOX® 4, " Technical Information (publication date unknown).

U.S Filter/Davis Process, "Chemical Feed and Storage Systems," Technical Bulletin, 1997, 6 pages.

Siemens Water Technologies Corp "Advanced Dosing Controllers for Odor Control Applications," printed on Sep. 8, 2006, www.usfilter.com/en/product.

Yara UK Limited, "Dosing Equipment," product description, printed on Sep. 8, 2006, http://ind.yara.co.uk/cgi-bin/ghc/local-uk/printer-friendly cgi?file=en/products_services/equipment_services/dosing_equipment/index.html; 1 page.

Yara UK Limited, "Dosing Controllers," product description, printed on Sep. 8, 2006, www.yara.com/en/products/gas_chemicals/equipment_and$_{13}$ services/equipment/dosing_controllers.html, 2 pages.

Yara UK Limited, "NUTRIOX," product description, printed on Sep. 8, 2006, www.yara.com/en/products/gas_chemicals/environmental_solutions/waste-water/nutriox.html, 2 pages.

* cited by examiner

DOSING CONTROL SYSTEM AND METHOD

CROSS-REFERENCE TO RELATED APPLICATION

This application claims the benefit of U.S. Provisional Application No. 60/722,200, filed Sep. 30, 2005, titled "CONTROLLER FOR DOSING PUMPS," which is herein incorporated by reference in its entirety.

BACKGROUND OF INVENTION

1. Field of Invention

This invention relates to systems and methods of controlling chemical dosage and, more particularly, to systems and methods of controlling the addition of a treating agent that effects the reduction of odorous species in sewage transfer systems.

2. Discussion of Related Art

Sewage systems include conduits typically that collect and direct sewage and other waste streams, such as rain water, to a treatment facility. Such systems typically include various pumping facilities, such as lift stations, that facilitate the transfer of the water, including wastewater, to such treatment facilities. During transit, however, odorous species are typically generated. Such odorous species are objectionable when released or discharged. Untreated sewage generates multiple odor-causing compounds, but the most prevalent and most distinctive compound formed is hydrogen sulfide. Hydrogen sulfide has a distinctive odor that can be detected at concentrations as small at 0.1 parts per million (ppm). In addition to having an offensive odor, hydrogen sulfide can also be a health hazard. Concentrations of as low as about 100 ppm can numb the sense of smell while concentrations of about 500 ppm may lead to pulmonary edema and, significantly, concentrations above about 1,000 ppm can cause collapse and death in humans.

In addition to being a health hazard, hydrogen sulfide is also a corrosion hazard. The moist environment typical of sewer systems facilitates hydrogen sulfide oxidation to sulfuric acid, which in turn can attack the infrastructure components comprising concrete, composite and metallic pipes and other structures of the system. Systems that have been left untreated for prolonged periods are typically severely corroded and can prematurely fail. Accordingly, odor and corrosion control, and treatment systems and techniques are typically utilized to minimize or at least reduce the level of such species.

For example, Howe et al., in U.S. Pat. No. 3,300,304, disclosed the anaerobic treatment of organic industrial wastes in an artificial lagoon. List, in U.S. Pat. No. 4,446,031, disclosed a sewage treatment composition, its manufacture and use. Mouche et al., in U.S. Pat. No. 4,681,687, disclosed the use of alkali metal nitrates to inhibit $H_2S$ formation in flue gas desulfurization system sludge. Tatnall, in U.S. Pat. No. 5,500,368, disclosed finely divided anthraquinone formulations as inhibitors of sulfide production from sulfate-reducing bacteria. Further, Ballinger, Jr. et al., in U.S. Pat. No. 6,309,597, disclosed a method for reducing hydrogen sulfide level in water containing sulfate-reducing bacteria and hydrogen sulfide-metabolizing bacteria. Bowers, in U.S. Pat. No. 5,045,213, disclosed a wastewater treatment method and apparatus. Richards, in U.S. Pat. Nos. 5,200,092 and 5,336,431, disclosed a composition and method for sulfide control. Miklos, in U.S. Pat. No. 6,660,163, disclosed waste treatment with control over biological solids. Vineyard, in U.S. Pat. No. 6,576,144, disclosed a method and apparatus for pretreatment of wastewater streams by chemical oxidation.

Recently, it has been proposed via commonly owned U.S. Pat. Nos. Re 37,181 and Re 36,651 (the entire content of each is expressly incorporated hereinto by reference) that the addition of nitrate, typically via an aqueous nitrate salt solution, to sewage systems, waste treatment plants and other industrial waste applications containing dissolved sulfides typically results in the elimination or substantial reduction of the sulfides, as well as the elimination of other minor odors associated with other sulfur-containing compounds. It is also known that significantly raising the pH of water streams (i.e., to greater than 10) by addition of an alkaline material (i.e. sodium hydroxide, calcium hydroxide) causes significant reduction of biological activity that produces dissolved sulfide.

SUMMARY OF THE INVENTION

An aspect of the invention involves one or more embodiments directed to a method of controlling addition of a treating agent into a fluid. The method can comprise acts of measuring at a measurement site a process value of a process parameter of the fluid, generating a first control signal based on a control function and the process value, introducing an amount of the treating agent based on the first control signal into the fluid, measuring at least one operating parameter of a source of the treating agent, and, in some cases, generating an expected operating value of the source of the treating agent based at least partially on the first control signal.

Further aspects of the invention involve one or more embodiments directed to a chemical feed system. The chemical feed system can comprise a sensor disposed to measure a first parameter of a fluid and to transmit a first measurement signal corresponding to the first parameter, a source of a treating agent disposed to introduce at least one treating agent into the conduit, and a controller in communication with the sensor and the source of the treating agent, the controller configured to receive the first measurement signal from the sensor and a second measurement signal corresponding to a measured parameter of the source of treating agent. The controller can be further configured to transmit to the source of the treating agent at least one control signal based at least in part on a control function and the first measurement signal.

Still further aspects of the invention involve one or more embodiments directed to a computer-readable medium. The computer-readable medium has computer-readable signals stored thereon that define instructions that, as a result of being executed by a controller, instruct the controller to perform a method of controlling addition of a treating agent into a fluid. The method of controlling addition of a treating agent typically comprises acts of generating a plurality of control signals based on a plurality of measured process values of a process parameter of a fluid and a plurality of demand values, transmitting a plurality of control signals to at least one source of the treating agent disposed to introduce the treating agent into the fluid, and, in some cases, generating at least one expected operating value of a source of the treating agent based at least partially on at least one of the plurality of control signals.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing.

In the drawings.

DETAILED DESCRIPTION

Figure 1:
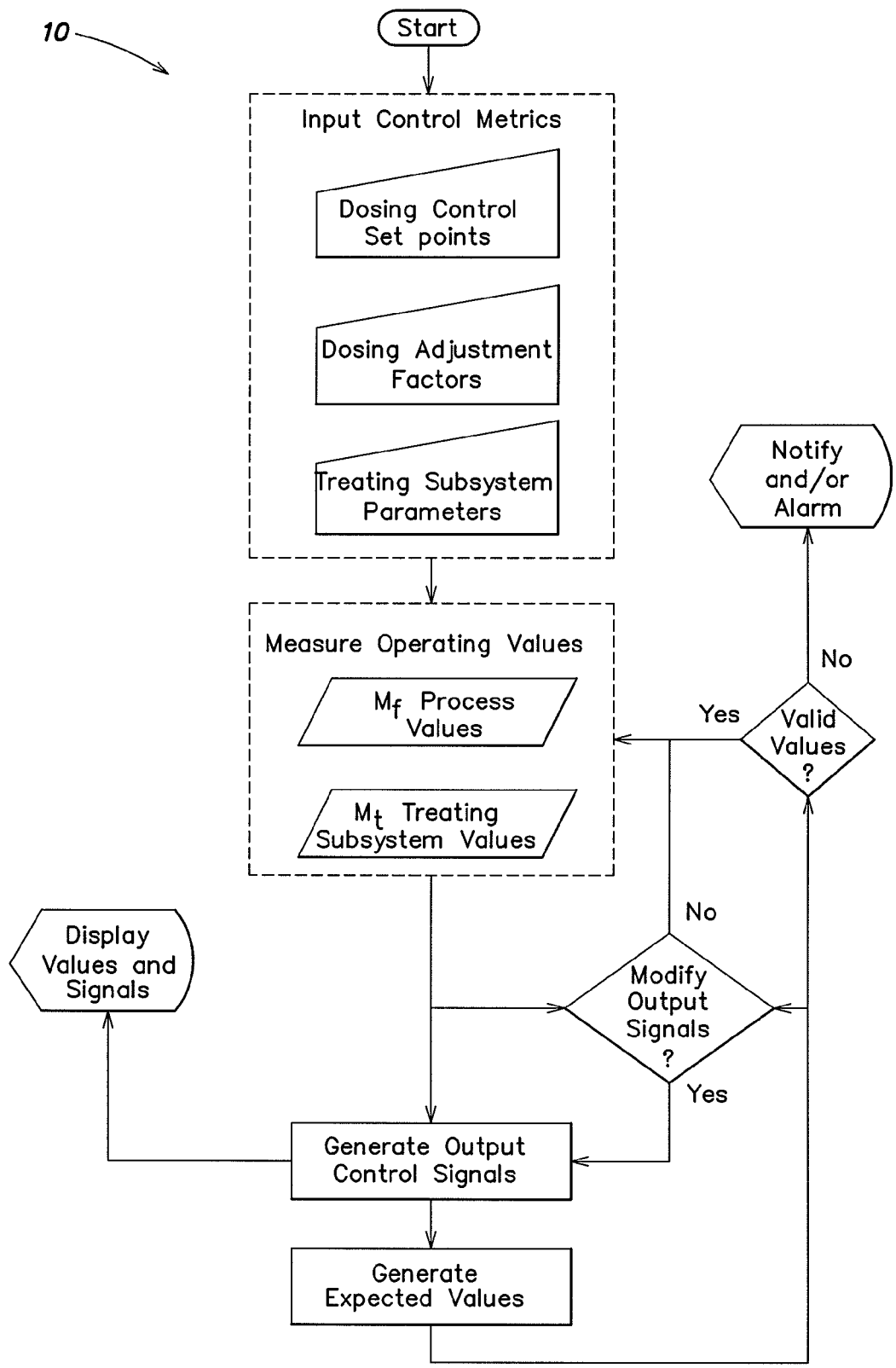
FIG. 1 is a flow chart illustrating a process in accordance with one or more embodiments of the invention.

This invention is not limited in its application to the details of construction and the arrangement of components set forth in the following description or illustrated in the drawings. The invention is capable of embodiments and of being practiced or of being carried out in various ways beyond those exemplarily presented herein.

The invention pertains to control systems and techniques. Several embodiments of the invention may be utilized to control one or more characteristics of one or a combination of chemical and biological treatment facilities. Further aspects of the invention may be utilized to control one or more characteristics of one or more subsystems of such treatment facilities. Still further embodiments of the invention may be utilized or adapted to components of such facilities.

The dosing control can be used to match a treating agent dose to an actual demand, e.g., septicity, of, for example, a collection system. Simply put, the advanced dosing system can dynamically feed a treating agent, e.g., a nitrate, based on a curve that matches continuously changing system demands. This reduces overfeeding and underfeeding conditions, thereby improving performance and reducing treatment costs.

One or more embodiments of the systems and techniques of the invention may be utilized, adapted, or otherwise incorporated into and at least partially control, regulate, provide, maintain, reduce, and/or, eliminate one or more characteristics of wastewater system. In some cases, some embodiments of the invention may be incorporated or utilized to facilitate treatment of a wastewater to change at least one characteristic thereof from having an undesirable condition to having an acceptable condition or quality. In particular instances, some control systems and techniques of the invention may be utilized or incorporated in a sewer, sewage collection system, or conveyance system of, for example, a municipality, which typically include at least one treatment facility wherein sewage or wastewater is treated. In other cases, the present inventive systems and techniques may be used in one or more subsystems of the sewage system. The invention, however, is not limited in its application to wastewater systems and/or components thereof. Indeed, the invention can be utilized in other municipal, commercial, and/or industrial operations that involve monitoring, regulation, and/or management of at least one characteristic of one or more process fluids and, in some cases, at least one associated source of chemical or biological reactant or agent. Thus, although the various aspects, features, and advantages of the invention are described relative to a treatment facility, the invention is not limited to such facilities and may be incorporated such other operations. Thus, the systems and techniques of the invention may be utilized to regulate and at least partially change a water body or stream from having an unfavorable condition to one having a preferred condition. For example, the systems and techniques of the invention may be utilized to control, regulate, and/or facilitate any of a biological process, a chemical process, or combination thereof.

Further aspects and features of the invention advantageously provide adaptive control approaches or methodologies to alter, monitor, limit, restrict, manage, control, regulate, reduce, or even minimize at least one characteristic of a treatment facility or a component thereof. In other cases, however, the aspects and features of the invention provide adaptive control approaches or methodologies that increase or even maximize at least one characteristic of a treatment facility of a component thereof. For example, one or more aspects of the invention may be directed to reducing or minimizing a concentration or activity of one or more particular species, products, byproducts or properties of one or more fluid streams in the treatment facility. Alternatively, some aspects of the invention may be directed to increasing a concentration of one or more particular species, products, byproducts or properties of one or more fluid streams in the treatment facility.

In one or more particular aspects, the invention can involve a method of controlling addition of a treating agent into a fluid. For example, one or more methods of the invention can comprise one or more acts of measuring at a measurement site a process value of a process parameter of the fluid and generating a first control signal based on a control function and the process value. The methods of the invention, in some cases, can further involve one or more acts of introducing an amount of the treating agent based on the first control signal into the fluid, measuring at least one operating parameter of a source of the treating agent, and generating an expected operating value of the source of the treating agent, typically based at least partially on the first control signal. One or more methods of the invention can further comprise one or more acts of measuring a plurality of process values of the process parameter. In still other cases, one or more methods of the invention can comprise one or more acts of generating a plurality of control signals, preferably based on the control function and the plurality of process values, and/or generating a plurality of expected operating values of the source of the treating agent, typically based at least partially on the plurality of control signals as well as, or in conjunction with, one or more acts of generating an alarm condition, typically when a magnitude of a difference between at least one expected operating value and at least one measured operating parameter of the source of the treating agent exceeds a predetermined tolerance value.

Still further aspects of the invention can be directed to feed systems, such as chemical feed systems. One or more systems of the invention can comprise at least one sensor disposed to measure a first parameter of a fluid and to transmit a first measurement signal corresponding to the first parameter and, in some cases, at least one source of one or more treating agents disposed to introduce at least one treating agent into the fluid. Particularly preferred embodiments of one or more systems of the invention can comprise one or even a plurality of controllers, wherein at least one controller is in communication with the at least one sensor and at least one, or the same, controller is in communication with at least one source of one or more treating agents. One or more controllers can, in some systems of the invention, be configured to receive at least one of the first measurement signal from the sensor and a second measurement signal corresponding to a measured parameter of at least one source of treating agent, and/or at least one or more sources of a plurality of treating agents. Further, at least one, but typically the same, controller can be configured to transmit to at least one source of the treating agent, at least one control signal based at least in part on a control function and the first measurement signal.

In some embodiments of the invention, at least one input device can be utilized to provide at least one measured and/or specified value. The at least one input device can be, for example, a sensor that can provide at least one measured value of at least one component or subsystem of the invention. The at least one input device can be an array of sensors disposed measure at least one characteristic of, for example, the fluid. As noted, the measured parameter can be representative of a concentration of at least one target species of the fluid. For example, the at least one input device can comprise at least one sensor that provides at least one measured value corresponding to a measured concentration of an odorous species in the fluid. The measured value can be a concentration of the target species of one or more phases of the fluid. For example, the target species can be a gas-phase odorous species or a liquid-phase odorous species. Notable embodiments of the invention comprise one or more sensors that measure one of a gas-phase concentration of at least one sulfur-bearing species and a liquid-phase concentration of at least one sulfur-bearing species. Non-limiting examples of target species include sulfides, such as hydrogen sulfide, iron sulfide, dimethyl sulfide, and dimethyl disulfide; mercaptans; and other odorous species or compounds from coke ovens, asphalt, oil and gas, tanneries, food processing, sewage, wastewater, paper mills, and rayon manufacturing facilities.

The at least one input device, in some embodiments of the invention, can be a flow sensor, disposed to measure a flow rate of, for example, at least one phase of the fluid and transmit at least one corresponding measured flow value to at least one controller of the system. In further pertinent embodiments of the invention, at least one controller can then be configured to generate at least one composite average flow curve based on at least one of the measured flow value and, in particularly advantageous cases, also be configured to identify a triggering condition based at least partially on the composite average flow curve and a currently measured flow value. One or more input devices can be remotely disposed from a point of introduction of the treating agent into the fluid. The triggering condition can be realized when, for example, a difference between the composite average flow curve and the current measured liquid flow value exceeds at least one predetermined tolerance value. Indeed, some preferred embodiments of the invention involve at least one controller that is configured, or at least configurable, to adjust the control signal based on at least one triggering condition.

Further embodiments of the invention utilize one or a plurality of sensors configured to measure and preferably provide an indication of operating parameter of a component or subsystem of the systems of the invention. The operating parameter can be a state or condition and the sensor can thus provide an indication or representation of the component or subsystem. For example, one or more systems of the invention can comprise at least one sensor disposed to measure a level or volume of treating agent in the treating agent source of the system. Still other parameters can be measured include, for example, the current driving one or more pumps of the system, the pH and/or the temperature of the fluid or water to be treated.

Other parameters can be, for example, any of the flow rates of the treating agent to and/or from one or more storage vessels of the treating agent subsystem, and the concentration or temperature of the treating agent. In some cases, the flow rate can be utilized to further improve the control techniques of the invention. For example, flow pacing techniques may be further utilized to adjust the rate of treating agent introduced into the fluid. Such techniques typically determine a treating agent dosage rate based on, for example a typical or design flow rate, and further decreases the dosage rate during periods of relatively increased fluid flow or increases the dosage rate during periods of relatively reduced fluid flow. Typically, the dosage rate can be reduced relative to a normal control basis because the amount of time the fluid, e.g., wastewater, remains in the sewage collection system decreases, which in turn decreases the potential or amount of sulfide produced during transit. In contrast, simple flow pacing techniques inappropriately tends to increase the dosage rate during high flow periods when the suitable should be decreasing the dose rate so as to reflect the reduced system demand. Thus, some embodiments of the invention can comprise utilizing a residence time of the fluid as a basis for controlling addition of one or more treatment agents. As noted, controlling addition of the treating agent can be based the measured process value, typically relative to a corresponding demand value of a control function. The control function can further incorporate adjusted flow pacing techniques of the invention to adjust, during, for example, relatively high fluid flow rates, the control signal and effectively reduce the dosage rate of the one or more treating agents by nesting the flow pacing algorithm. The systems and techniques of the invention, however, can be practiced in other ways. For example, the adjusted flow pacing approach of the invention can be utilized to control a first pump configured to introduce a first treating agent into the fluid, or a portion of one or more treating agents into the fluid at a first dosage rate, whereas the generated control signal based on the measured process value representing a concentration of one or more odorous species and a demand value can be utilized to control a second pump configured to introduce a second treating agent or the first treating agent at a second dosage rate. Thus, in some embodiments of the invention, the adjusted flow pacing techniques of the invention can be considered as de-coupled from the liquid phase odor control approach of the invention. Other pump types that may be used include peristaltic pumps as well as variable frequency drive pumps.

The control function can comprise a plurality of demand values. In some embodiments of the invention, a plurality of demand values can be used to constitute an array of demand values that can at least partially define one or more control functions. Particularly advantageous aspects of the invention can be facilitated by utilizing at least one measured value from at least one input device and a control function or at least one demand value thereof. For instance, in some embodiments of the invention, at least one process parameter is monitored to provide a measured process value. The process value corresponding to demand value of a control function can then be utilized to control and provide a corresponding control signal. For example, a measured value at the first hour of a day can be used with a demand value assigned for the same hour. If an hourly array of demand values is predefined or predetermined and provided, then the process parameter can be measured hourly and the corresponding measured value, along with the corresponding hourly demand value can be used to provide a control signal. The control signal can then be utilized to, for example, drive one or more pumps or actuate one or more valves of one or more sources of a treating agent. In such fashion, the systems and techniques of the invention can thus control treatment based on control function that can have a plurality of control targets or set points.

In some embodiments of the invention, at least one of the measured value and the operating parameter is determined periodically, or upon demand. Thus, in some cases, a measured value of a characteristic or condition of the fluid is measured in accordance with a predetermined schedule. For example, the concentration of an odorous species can be measured by at least one input device at periodic intervals and thus provide a plurality of measured values of at least one process parameter of the fluid. If, for example, the process parameter is sampled hourly, then an array comprising twenty-four periodic process values would be measured daily. The array can also be configured based on a weekly demand profile. For example, a set of control points or demand values can comprise one or more demand functions. Indeed, the control function can be defined on a daily, weekly, monthly, or seasonal basis. In particular embodiments of the invention, a control function is defined for each day of the week thereby being adapted to accommodate, for example, seven sets of twenty-four hourly demand values. The invention, however, is not limited to embodiments involving hourly measurements and may be practiced utilizing other sampling rates. Moreover, the sampling rates need not be uniformly periodic and may be temporally asymmetrical in which the sampling rate can be greater at certain periods of, for example, a day, week, or month relative to other periods of the day, week, and/or month.

Further optimization can be realized during changes in the diurnal flow profile commonly exhibited in municipal wastewater systems. For example, the demand values can be dynamically adjusted based on historically measured process values. The control techniques of the invention can self-adjust at least one demand value of one or more control function based on, for example, past measured data. For example, if a measured process value is measured or determined to be greater than an historical average, the systems and techniques of the invention can adjust a corresponding hourly, daily, weekly, or even monthly, demand value. The historical average can be determined on a daily basis, e.g., as an average of measured value of the corresponding hours of a day; on a weekly basis, e.g., as an average of measured values of the corresponding hours of a week; or even on a seasonal or yearly basis.

Safeguards can also be incorporated to ensure stable control of the system. For example, the adjusted demand value can be limited to a predetermined percentage of the original demand value, such as, within about 10%. Other control limits may be utilized including, but not limited to requiring operator confirmation of any change in predefined demand values, or even requiring a hierarchical approval relative to the magnitude of change. For example, a relatively low percentage change, e.g., less than about 2%, may be effected without approval, whereas an intermediate percentage change, e.g., less than about 10% may be adopted with operator-level approval, and any high percentage change, e.g., greater than about 10% may be incorporated with supervisory-level permission.

In one or more embodiments of the systems and techniques of the invention, at least one controller can be configured to receive, for example, the second measurement signal and generate a measured characteristic value of at least one operating parameter of at least one source of the treating agent. Further, at least one controller can be further configured to generate an expected characteristic value of at least one source of the treating agent based at least in part on at least one control signal, and/or to determine a relative characteristic value based on the difference between the measured characteristic value and the expected characteristic value.

For example, as noted the control systems and techniques of the invention can generate a control signal based at least partially on a measured value of a process parameter and a corresponding demand value of a control function. The measured value can be measured, for example, at a first hour and the control signal can be based on a difference between the measured value and the demand value as pre-designated for that first hour. Other hourly measurements would then be used along with corresponding demand values. The plurality of periodic control signals can then be used to generate an aggregate or total, corresponding treating agent dosage amount. The aggregate dosage amount can then be used to estimate an expected operating parameter, condition, or value of, for example, the source of treating agent, or subsystem. Some embodiments of the invention further comprise one or more input devices monitor or measure at least one operating parameter of the source of treating agent. The aggregated dosage amount can then be advantageously compared to the expected operating value or parameter. If a difference between the measured and expected operating conditions or values exceeds a tolerance, then one or more actions can be initiated by the systems and techniques of the invention. For example, if the difference exceeds a measurement error limits, then an alarm condition can be generated and transmitted to one or more output devices thereby, in some cases, requiring the attention of an operator.

Further embodiments of the invention facilitate maintaining a sufficient amount of the one or more treating agents. In some cases, the composite average and/or the measured operating parameter of one or more sources of at least one treating agent can be utilized to initiate and/or notify when the stored amount of treating agent should be replenished. For example, when the measured amount of the treating agent in at least one source is at or approaches a percentage of the total storage amount, the systems and techniques of the invention can send a notification by, for example, an alarm, and/or printed or electronic message. In some cases, the condition for replenishing can be triggered relative to an anticipated number of days of treating agent remaining. This condition can be determined based on, for example, the rate of usage of a treating agent and the remaining volume.

Further advantageous features of the invention can also incorporate or compensate for any adjust for variations in storage capacity. For example, the control systems and techniques of the invention can accept parameters that define a suction line offset or an unavailable volume in one or more storage vessels that contain a treating agent. This advantageously further provides usable information and reduces the need for any operator involvement and uncertainties that could result therefrom. Significantly, such compensatory provisions can be tailored for each storage vessel thereby providing an accurate status of the characteristics of the system or subsystem.

In accordance with one or more embodiments of the invention, the systems and techniques of the invention may be configured to recognize conditions that obviates or reduces the need for treating agents. The systems and techniques of the invention can thus be further configured to adjust, e.g., reduce or even minimize, the control signal during such reduced demand conditions. For example, rain can increase the flow rate of the fluid in sewer systems. The increased flow condition can be manifested as a direct flow meter measurement and/or increased pump current draw. The increased flow rate, depending on the amount of precipitation, can effectively reduce or even eliminate the amount or dosage rate of treating agent because, as discussed above, of the effectively reduced fluid residence time and/or, in some cases, because of dilution effects. Thus, some embodiments of the systems and techniques of the invention can be configured to recognize elevated fluid flow rates associated with rain, which can also be referred to as rain curves. Moreover, some embodiments of the invention contemplate adjusting or controlling of the amount or dosage rate of the treating agent based on the rainfall amount. For example, a flow sensor or pump activity level can be utilized to measure a fluid flow rate; if the measured flow rate increases in a relatively short period such as within less than about six hours, and in contrast to a weekly or monthly historical increase, then the treating agent dosage amount or rate can be reduced accordingly. Further embodiments contemplate a staged control approach, utilizing, for example, a plurality of rain curves to modify at least one output signal. For example, during an abnormally high flow condition, a dosing reduction factor can be initiated. Further, rain curves can be used to define the factors; typically, greater rainfall directs a larger adjustment factor.

In some cases, the measured flow rate can be classified as or according to a composite average flow rate. Further, a deviation from the composite average flow rate, which can be defined as an average, e.g., a moving average, of fluid flow rates, can be utilized in adjusting the treating agent amount or dosage rate. For example, the treating agent amount and/or dosage rate can be reduced to a first level or percentage for a first predetermined rainfall amount and to a second level or percentage for a second predetermined rainfall amount. Further levels of adjustment can be utilized as desired. Other embodiments may further utilize safeguards to avoid false positive determination of rainfall events. For example, a predetermined tolerance condition or value may used to validate a triggering condition indicative of the rainfall event and/or avoid chattering nuisance. If, for example, the amount or rate of fluid flow increases by certain predetermined value, e.g., greater than about 10% of, for example, the composite average flow curve, then a rainfall event is considered likely and an adjustment of the amount and/or dosage rate would be accordingly initiated. Other predetermined tolerance conditions or values may also be utilized, alone or in conjunction with the above approach. For example, the tolerance condition may be require consecutive elevated measured fluid flow rates, relative to the composite average flow curve, before the triggering condition is recognized or acknowledged.

Other nested or ancillary control loops may be incorporated into or around the treating agent dosage rate control block. Analogous to adjusted flow pacing, the pH and/or temperature of the fluid may be used to decrease, increase, or otherwise adjust the control signal directed to, for example, the dosage rate of the treating agent. For example, where the temperature of the fluid is elevated, especially relative to a baseline such as ambient temperature or about 20° C., the dosage rate can be increased to counteract an increase in biological metabolic activity. If biological activity can be considered to approximately follow an Arrhenius temperature dependence, then the dosage rate can be increased to accordingly compensate for a doubling of activity or rate of generation of odorous species for every 10° C. increase. Conversely, during colder periods, e.g., when the sewage fluid temperature approaches about 12° C. to about 13° C., the control signal can be reduced to accordingly accommodate reduced activity associated with lower than expected temperatures. Analogously, pH based adjustments may be utilized to compensate odorous species generation during periods of higher and lower fluid pH conditions. The pH and/or temperature adjusted control blocks or algorithms can be nested with the any of the other control blocks or algorithms.

The control signal, in some embodiments of the invention, can actuate, activate, or otherwise facilitate energizing, and/or de-energizing at least one unit operation of the systems and techniques of the invention. At least one control signal, in some embodiments, can involve time-splicing by comprising at least one active component and at least one dormant component. In some cases, for example, the control signal can be a composite signal comprising a plurality of output drive signals, one or more of which may, at any or desired period or cycle, energize or de-energize at least one unit operation of the system. In such cases, for example, the magnitude of the active component can, preferably, be a function of a characteristic of at least one component of the system of the invention and a control quantity. For example, control signal, or an active component thereof, can, at least partially, be based on a difference between a measured parameter and a demand value. The control signal can, for example, be based on the difference between the first measured parameter and a corresponding demand value. Alternatively, or in accordance with other embodiments of the invention, the control signal can be, at least partially, defined as an active component of duty cycle period. The duty cycle can comprise periods, typically alternating active periods with dormant periods that energize and de-energize at least one unit operation of a subsystem of the treatment system. For example, the control signal can be comprised of a duty cycle including at least one active period that instructs or otherwise energizes an unit operation to, for example, perform a predetermined procedure or task, and can further be comprised of at least one dormant period that instructs or otherwise de-activates the unit operation from performing the procedure.

The control signal may be manifested in terms of a duty cycle having a predefined time period. Indeed, advantageous embodiments of the invention can involve control signals that are at least partially based on a duty cycle, having a plurality of active and dormant periods. Particularly advantageous embodiments involve control signals with duty cycles in which the temporal magnitude of an active period is biased relative to the temporal magnitude of a dormant period. For example, the duty cycle can be predefined to be a one minute cycle, then an active period of the control signal can be a fraction of one minute, e.g., six seconds or 10% of the duty cycle; twenty seconds or about 33% of the duty cycle; or thirty seconds or about 50% of the duty cycle. The corresponding dormant period of the duty cycle would, respectively, be 54 seconds or about 90% of the duty cycle; forty seconds or about 66% of the duty cycle; or thirty seconds or about 50% of the duty cycle. As noted, the duty cycle can be a predefined quantity and is not limited to one minute cycles. For example, the duty cycle can be predefined as three minutes, ten minutes, or even sixty minutes. Defining a duty cycle can be established for each dosing assembly or system and may even vary and be a function of one or more factors including, for example, deviations from expected values, such as errors in expected relative to actual values, and even based on the time, day, month, and/or season.

The control signal may be further modified as desired by applying one or more adjustment factors. For example, with respect to an output signal directed to dosing one or more treating agents, one or more dosing adjustment factors can modify the control signal, typically, the magnitude and/or, in some cases, the duration of the active component of the output signal. The dosing adjustment factor can be applied to modify a rate or amount of treating agent introduced to the fluid. For example, a global dosing adjustment factor can be used to reduce the amount and/or rate of a nitrate containing treating agent by about 5%, by about 10%, about 15%, or even by about 20%, depending, for example, on one or a plurality of conditional requirements that can trigger each level of adjustment. In some cases, a plurality of dosing adjustment factors can be employed, any one or more of which can have one or a plurality of conditions that must be present before being activated. For example, a dosing adjustment factor can conditionally be activated only during rainfall events, during a predetermined part of a day, week, month, or year.

Various embodiments of the invention can further comprise one or more acts of modifying at least one demand value of the control function and/or generating an alternative control signal based at least partially on the modified demand value and a second measured process value of the process parameter. The process parameter, in some particular embodiments of the invention, can be representative of a concentration of an odorous species in the fluid. Moreover, the treating agent, in some embodiments of the invention, can comprise at least one of a nitrate species and an alkaline. Thus, for example, the measured first parameter in one or more systems of the invention can be representative of a concentration of target species in the fluid. In one or more particular embodiments directed to the systems of the invention, the control function can comprise an array of demand values.

Although the treating agent can be a nitrate containing species or an alkaline material, any suitable treating agent may be utilized in the invention. Particularly advantageous agents of the invention can affect at least one characteristic of the fluid. For example, the nitrate containing species can be used to reduce the likelihood of biological activity pertinent to generating odorous compounds such as hydrogen sulfide. Non-limiting examples of treating agents include acids, bases, oxidizers, disinfectants, as well as those commercially available as BIOXIDE® odor control solution and ODOPHOS® ferrous iron solution, each of which is available from Siemens Water Technologies Corp.

The terms "sewer" and "sewage collection system" refer to a conduit, or a series and/or a network of conduits that may be interconnected through one or more pumps or lift-stations. The terms "treatment system" and "treatment facility" refer to any system in which fluid, typically wastewater and/or sewage, is treated, processed, or otherwise rendered to have at least one undesirable constituent removed, or a concentration thereof, reduced therefrom.

One or more embodiments of the invention can be implemented according to the flowchart exemplarily presented in FIG. 1. The process of the invention can comprise entering one or a plurality of control metrics such as one or more demand values or dosing control set points that can define the control function. Other control metrics that may be utilized include operating parameters of the treating subsystem such as pump types and/or flow capacities, storage volumetric capacities, any respectively unavailable volumes, as well as types of instruments or input signals, e.g., raw current or pressure signals, normalized, or whether any such signals have been converted to engineering units. Further control metrics can be utilized and entered include, for example, one or more tolerance values or conditions as discussed above as well as optional metrics such as one or more dosing adjustment factors. The one or more control metrics can be provided to the system by, for example, a man-machine interface.

In some cases, one or more operating values can be measured. For example, as shown in FIG. 1, a process value of the fluid can be measured and a treating subsystem operating value can be measured. Each of the values is measured discretely, for example, at predetermined time intervals or continuously.

The operating values and the control metrics can then be used to generate at least one output signal that, for example, energizes a pump of the treating subsystem. One or more expected operating parameters can also be generated. For example, an expected level of the container storing the treating agent can be generated. Any one or more such generated quantities can be displayed to an output device, such as a monitor or even the man-machine interface thereby providing a status of one or more components or subsystems. Optionally, various conditional inquiries can be examined to determine whether the output should be modified. If no condition triggers a modification, then the output signal is transmitted to the appropriate unit operation, e.g., the pump or the valve regulating addition of one or more treating agents. Otherwise, a modified output signal is appropriately generated which is then transmitted to the unit operation.

As discussed, further embodiments of the invention provide validation of expected characteristics of one or more subsystems. One or more controllers can, for example, receive the generated expected values of the source of treating agent and compare the expected value to the measured value. If the measure values are inconsistent with the expected values, then an alarm and/or instruments providing notification are generated or activated.

Accordingly, the systems and techniques of the invention can facilitate monitoring of a subsystem by for example, providing timely alarm, e.g., hourly rather than daily notifications. Further embodiments of the invention utilize communications subsystems as output devices, such as modems, to facilitate off-site or remote transmission and monitoring of the components of the system. Conversely, remote access may also be effected by such devices thereby effectively utilizing one or more modems as input devices of, for example, one or more control metrics. Moreover, the various measured and/or generated values can be graphically displayed in one or output devices and/or transmitted to one or a plurality of remote stations. Embodiments including interfacing with one or more websites for retrieving, storing, monitoring, and/or transmitting values, metric, and other characteristics may also be utilized. For example, data can be periodically or continuously transmitted to one or more Internet points wherein anyone or more of the above-discussed features can be performed. Indeed, a remotely disposed controller can be utilized by communicating with the various unit operations of the system through the Internet thereby effectively disposing a controller at a remote location.

Figure 2:
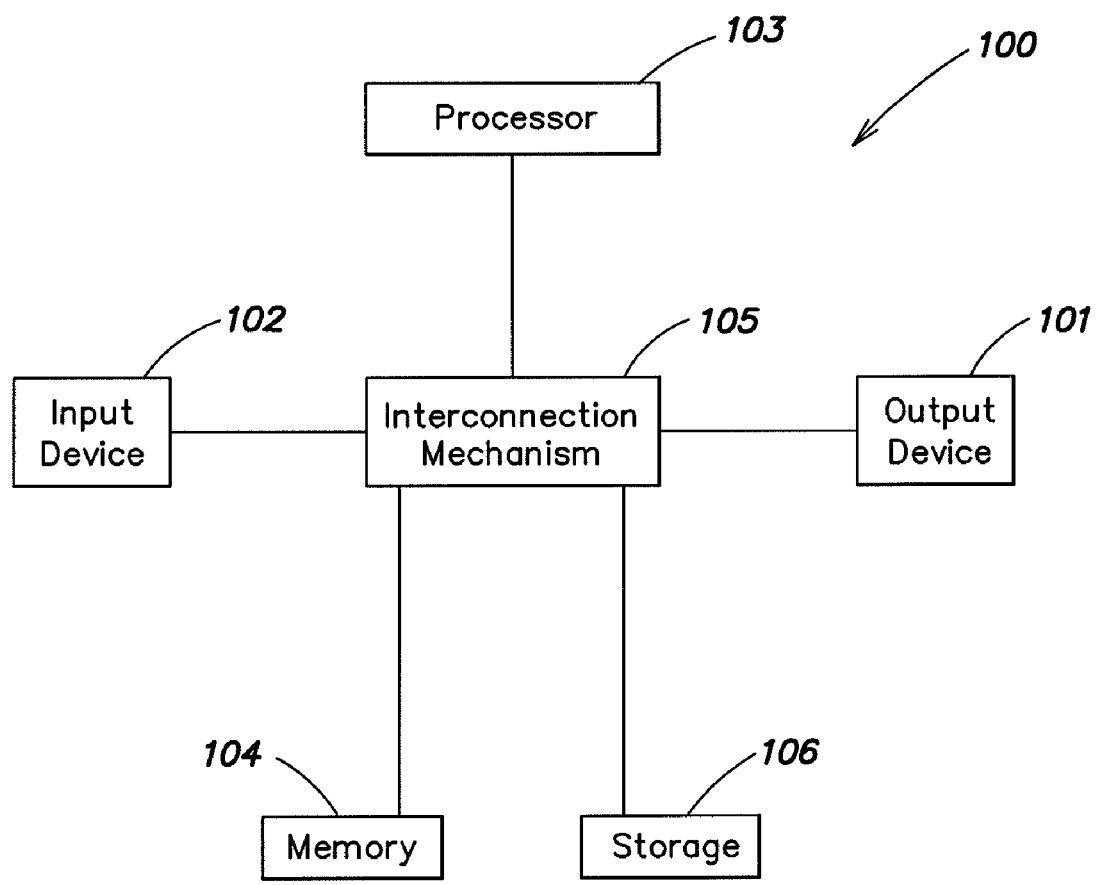
FIG. 2 illustrates a computer system upon which one or more embodiments of the invention may be practiced.

Control of the system 10 of the invention may be implemented using one or more computer systems 100 as exemplarily shown in FIG. 2. Computer system 100 may be, for example, a general-purpose computer such as those based on an Intel PENTIUM®-type processor, a Motorola PowerPC® processor, a Sun UltraSPARC® processor, a Hewlett-Packard PA-RISC® processor, programmable logic controllers or any other type of processor or combinations thereof. Alternatively, the computer system may include specially-programmed, special-purpose hardware, for example, an application-specific integrated circuit (ASIC) and/or SCADA systems.

Computer system 100 can include one or more processors 103 typically connected to one or more memory devices 104, which can comprise, for example, any one or more of a disk drive memory, a flash memory device, a RAM memory device, or other device for storing data. Memory 104 is typically used for storing programs and data during operation of the system 10 and/or computer system 100. For example, memory 104 may be used for storing historical data, alarms, or other logs relating to one or more values or parameters over a period of time. Software, including programming code that implements embodiments of the invention, can be stored on a computer readable and/or writeable nonvolatile recording medium (discussed further with respect to FIG. 3), and then typically copied into memory 104 wherein it can then be executed by the one or more processors 103. Such programming code may be written in any of a plurality of programming languages, for example, ladder logic, Java, Visual Basic, C, C#, or C++, Fortran, Pascal, Eiffel, Basic, COBAL, or any of a variety of combinations thereof.

Components of computer system 100 may be coupled by an interconnection mechanism 105, which may include one or more busses (e.g., between components that are integrated within a same device) and/or a network (e.g., between components that reside on separate discrete devices). The interconnection mechanism typically enables communications (e.g., data, instructions) to be exchanged between components of computer system 100 or even system 10.

Computer system 100 can also include one or more input devices 102, for example, a keyboard, mouse, trackball, microphone, touch screen, and one or more output devices 101, for example, a printing device, display screen, or speaker. In addition, computer system 100 may contain one or more interfaces (not shown) that can connect computer system 100 to a communication network (in addition or as an alternative to the network that may be formed by one or more of the components of system 10).

According to one or more embodiments of the invention, the one or more input devices 102 may include sensors for measuring parameters. Alternatively, the sensors, the metering valves and/or pumps, or all of these components may be connected to a communication network that is operatively coupled to computer system 100. For example, one or more of pH, oxidation-reduction potential, temperature, and concentration sensors may be configured as input devices that are directly connected to computer system 100, and metering valves and/or pumps of one or more subsystems may be configured as output devices that are connected to computer system 100, and any one or more of the above may be coupled to another computer system or component so as to communicate with computer system 100 over at least one communication network. Such a configuration permits one sensor to be located at a significant distance from another sensor or allow any sensor to be located at a significant distance from any subsystem and/or the controller, while still providing data therebetween.

Figure 3:
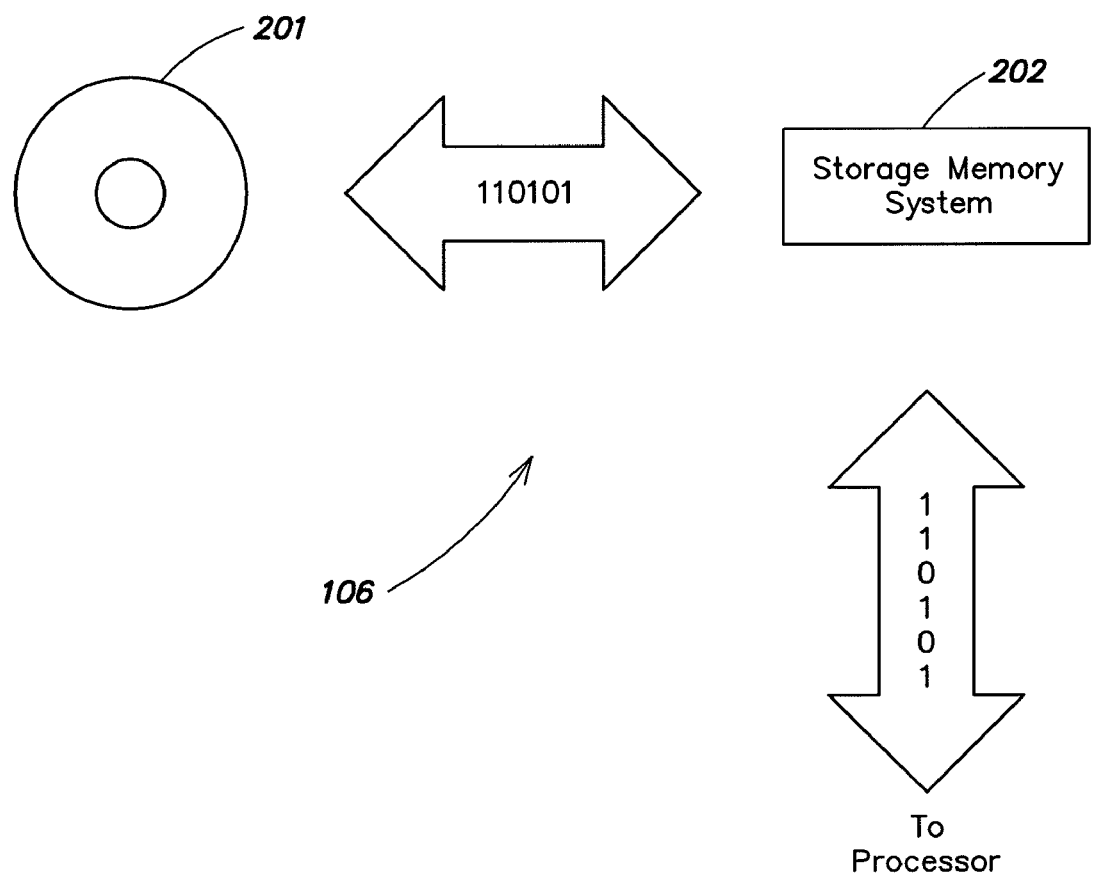
FIG. 3 illustrates a storage system that may be used with the computer system of FIG. 3 in accordance with one or more embodiments of the invention.

As exemplarily shown in FIG. 3, controller 100 can include one or more computer storage media such as readable and/or writeable nonvolatile recording medium 201 in which signals can be stored that define a program to be executed by one or more processors 103. Medium 201 may, for example, be a disk or flash memory. In typical operation, processor 103 can cause data, such as code that implements one or more embodiments of the invention, to be read from at least one storage medium 201 into a memory 202 that allows for faster access to the information by the one or more processors than does medium 201. Memory 202 is typically a volatile, random access memory such as a dynamic random access memory (DRAM) or static memory (SRAM) or other suitable devices that facilitates information transfer to and from processor 103.

Although computer system 100 is shown by way of example as one type of computer system upon which various aspects of the invention may be practiced, it should be appreciated that the invention is not limited to being implemented in software, or on the computer system as exemplarily shown. Indeed, rather than implemented on, for example, a general purpose computer system, the controller, or components or subsections thereof, may alternatively be implemented as a dedicated system or as a component of dedicated systems including but not limited to programmable logic controllers, such as SIMATIC® S7-226 CPU device, available from Siemens AG, and/or distributed control systems. Further, it should be appreciated that one or more features or aspects of the invention may be implemented in software, hardware or firmware, or any combination thereof. For example, one or more segments of the steps illustrated in FIG. 1 can be executed in separate computers, which in turn, can be communicated through one or more networks.

It should be appreciated that numerous alterations, modifications, and improvements may be made to the illustrated system. Although various embodiments exemplarily shown have been described as using sensors, it should be appreciated that the invention is not so limited. For example, rather than requiring any electronic or electromechanical sensors, the measurement of levels could alternatively be based upon the senses of an operator. Alternative conditional requirements may include, for example, verifying operation of a pump or lift station and introducing the treating agents only when fluid is transported.

Moreover, the invention contemplates the modification of existing facilities to retrofit one or more systems, subsystems, or components and implement the techniques of the invention. Thus, for example, an existing facility including one or more installed sensors can be modified to include a controller executing instructions in accordance with one or more embodiments exemplarily discussed herein. Alternatively, existing control systems can be reprogrammed or otherwise modified to perform any one or more acts of the invention.

EXAMPLES

The function and advantages of these and other embodiments of the invention can be further understood from the examples below, which illustrate the benefits and/or advantages of the one or more systems and techniques of the invention but do not exemplify the full scope of the invention.

The examples illustrate an embodiment of the invention directed to utilizing cost effective liquid phase odor control (LPOC) to control of odor and corrosion due to hydrogen sulfide ($H_2S$) in sewage collection systems. The typical sewage flow patterns present in municipal collection systems are not conducive to the traditional methods of dosing LPOC products, namely feeding at a fixed rate and simple flow pacing.

The advanced process control systems of the invention were developed to address the dynamic nature of $H_2S$ generation in sewage force mains and gravity interceptors. The "dose to demand" techniques of the invention were used to a LPOC dose profile that tracks the hourly, daily, weekly, and monthly fluctuations of sewage parameters that dictated the degree of septicity in the portion of the sewer requiring odor control. The dose to demand based approach was tailored to the specific project and facility requirements and was composed of various components such as advanced dosing controllers, liquid and vapor phase data collectors, storage tank monitors, data transmitters, databases, and websites. The examples illustrate the capabilities of the various process control components and integration to create real time dose to demand systems of the invention.

Operational data from a cross section of installations are presented. In the examples, the improved performance and/or the reduction in LPOC treating agent usage, typically in excess of about 20%, were obtained from utilizing the advanced dose to demand control systems and techniques. Additional benefits such as improved shipping logistics, inventory management, customer access to data and remote process control were realized.

Conventional LPOC feed systems typically utilize simple methods of control. For example, a common practice of feeding is based on estimating the amount of product required per day and accordingly dose or control addition of such amount evenly over the course of the day. The practice of feeding at one fixed rate during the day typically results in periods of significant overfeeding of the treating agent, which leads to excessive usage and poor overall control. Significantly, however, periods of underfeeding can create objectionable conditions and undesirably increases corrosion vulnerability. The invention, in contrast, involves a LPOC feed system that delivers a product dose that matches the actual demand.

In LPOC dosing, data collectors were used to collect atmospheric $H_2S$ and dissolved sulfide readings. The collector used was able to capture $H_2S$ readings every five minutes. This effectively provided a continuous curve of $H_2S$ levels to be obtained from the control point. The operator uses this data to determine if the feed system is meeting the treatment goals throughout the day, and if not, what times the upstream feed system needs to be adjusted.

Sensors and transmitters also measured storage tank inventory. Other parameters of importance that were also measured included temperature, pH and Oxidation Reduction Potential (ORP).

Figure 4:
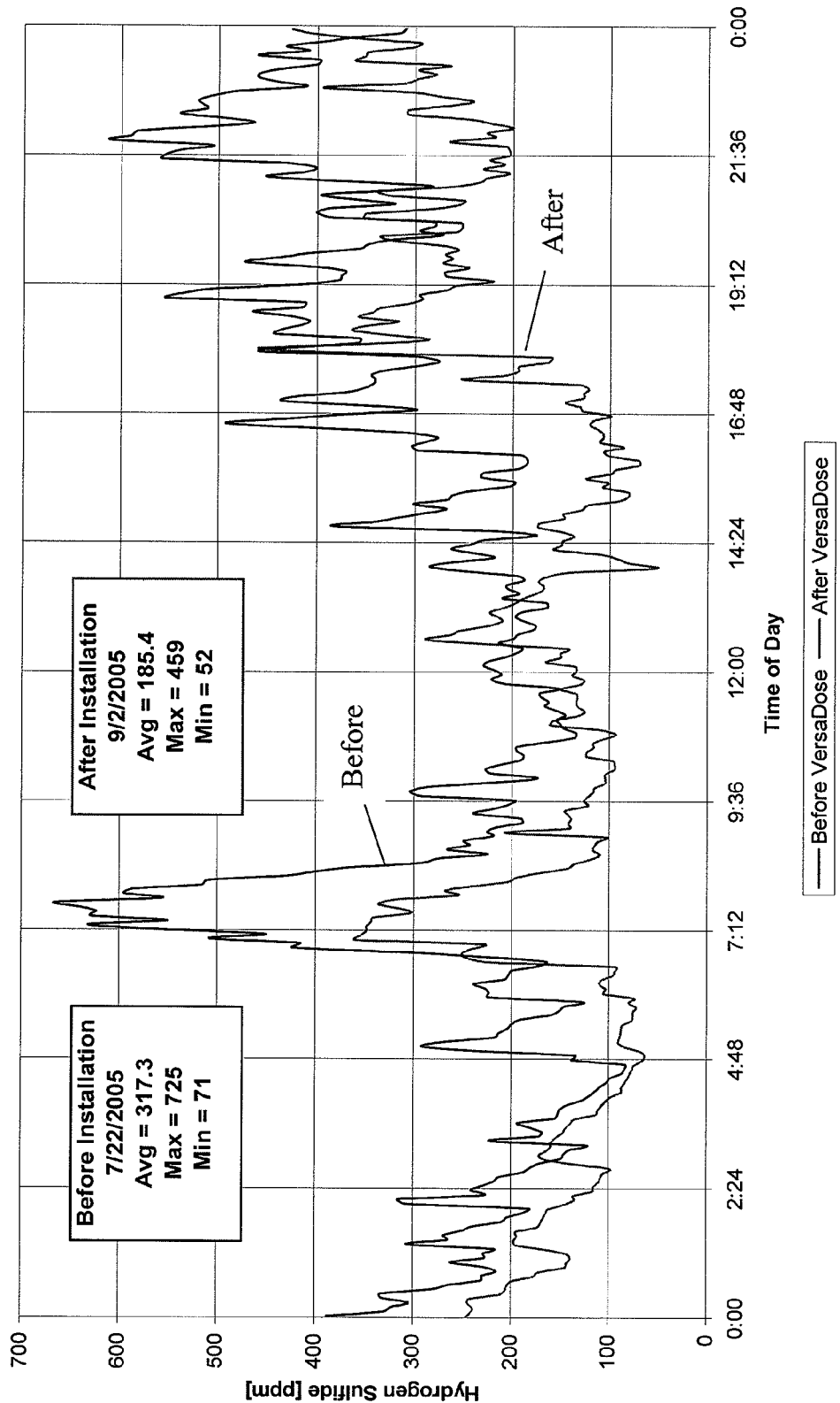
FIG. 4 is a graph comparatively illustrating the amount of agent used in accordance with an exemplary control scheme of the invention relative to the conventional approaches of constant dosage and selective two pump control.

The effect of curve dosing on LPOC agent consumption is shown below in FIG. 4. This chart illustrates the product requirements using time technologies for a given level of required odor control. As shown, the ability to vary the feed rate continuously over the course of the day allowed for a more efficient use of product that matches the product dose to the product demand of the system.

Storage tank sensor signals were fed to the advanced dosing controllers of the invention to take advantage of the controller's ability to compare dosing rates with tank drop. Using this feature, pump calibration problems, system failures or other factors that may cause the system to perform differently than designed were discovered before the system suffered any adverse effects.

Example 1

SBSA Case Study

The SBSA is an authority providing wastewater transmission, treatment, and recycled water production services to a population of more than about 217,000 individuals and businesses in California. The SBSA has a Class V Certification and its rated average design wastewater flow is about 29 MGD, with peak wastewater flow reaching towards about 72 MGD. SBSA's objective for odor control is to mitigate hydrogen sulfide ($H_2S$) to less than 30 parts per billion (ppb). This goal is met primarily by reducing dissolved sulfides in the primary effluent to less than about 0.1 mg/L. This was achieved by nitrate dosing, which serves to remove existing sulfides and prevent the formation of new sulfides in the forcemain because the nitrate solution is a preferred oxygen source for the microorganisms in the absence of free oxygen. This allowed for sulfate molecules to remain intact and avoid production of dissolved sulfides.

In prior control systems, an hourly dosing schedule for nitrate was used. The prior system was based on trial and error and "best guess" of experienced staff.

A nitrate feed station was located at a first pumping station that is approximately 1.5 miles upstream of the WWTP. This is a small line that exhibited odor issues due to its low flow rate, approximately 1 MGD, long retention time and high level of dissolved sulfides upwards of 10 mg/L. The current odor control dosing system was installed in 2004 to replace a system that fed approximately 1,100 gallons per day of bleach into the forcemain. The bleach was replaced with non-hazardous nitrate and the feed rate was reduced to less than about 100 gallons per day. This change resulted in an about 65% reduction in chemical cost. Nitrate dosing at this location is now the primary chemical used to control dissolved sulfides.

This station used a single tank and a two fixed speed pump/two timer dosing system. This station was equipped with a wireless transmitter that allowed for the storage tank level to be transmitted to the WWTP and for the pumping system to be turned on or shut off by the SBSA supervisory control and data acquisition (SCADA) system. The storage tank level transmitter was also configured to send data once per day to a tank monitoring website via a cellular connection.

The primary forcemain into the WWTP was treated with a nitrate feed system located at a second pumping station. This station was approximately 3.5 miles upstream of the treatment plant and transported the vast majority of the sewage loading.

The pumping system at the second station utilized two storage tanks and variable speed pumps. The pumps were controlled by the advanced dosing controller located at the WWTP via a telemetry system. The telemetry system allowed for the nitrate dose to be sent to the station continuously as well as for the storage tank level to be sent back to the treatment plant. The second pumping station was chosen as a feed site due to its proximity to the plant, which allows for sufficient reaction time of the nitrate treating agent.

The two nitrate dosing systems did not function in a traditional manner; they were integrated with two final major components that transformed what were formerly two independent chemical feed systems into an embodiment of an advanced dosing system of the invention.

The SCADA system in the SBSA control room served as the central communications hub of the system. It received storage tank levels from the two pumping stations as well as dosing rate and sewage temperature from the advanced dosing controller. The SCADA system sent the on/off command for the first station and the dosing rate to the second pumping station and also sent sewage flow rate, sewage pH, and the second station tank level to the advanced dosing controller.

The advanced dosing controller performed all of the logic functions for the dosing system. The controller utilized the data sent from the SCADA system as well as the sewage temperature, which was sent to the controller using a wireless transmitter, to calculate a nitrate dosing profile. The dosing profile, along with the sewage flow, second station tank level and sewage temperature, were transmitted to a website using a cellular modem for easy viewing. The same modem allowed personnel to access and change the operating parameters of the advanced dosing controller. The dosing profile calculated by the advanced dosing controller was created from an algorithm that used sewage flow, sewage temperature and historical data. The program also used several parameters that were easily altered to change dosing performance.

Criteria for dose reduction during rain events for the controller were developed. The rain function used three increasingly high flow profiles and three corresponding dose reduction factors to gradually step the dose down as the rain flow increased. During these high rain events the SCADA system was also able to send a shut-off command to the first pumping station. The SCADA system was also able to override the advanced dosing controller if necessary.

The SBSA system used caustic dosing to strip the slime layer from its forcemain, theoretical sulfide generation varies depending on frequency and strength of the caustic dose. This variance in sulfide generation creates a need to vary the nitrate dosing in order to fully optimize the nitrate usage. The installed advanced dosing controller allowed for future programming to account for the pH spike that would occur at the treatment plant as a result of the caustic dose and to adjust nitrate dosing as needed.

The present configuration of the SBSA system has the advanced dosing controller dosing a unique profile that allows the system to feed between about 350 to about 900 gallons per day of nitrate solution, depending on the season. The controller website was used to order product for the second pumping station and maintain operation thereof.

The control systems and techniques of the invention limited dissolved sulfide to about 0.1 mg/L; excess nitrate residual levels were less than about 1.0 mg/L.

Each of the tanks had a value for low, critically low, and dry levels. Low levels reflected a condition where the unit has been emptied to a level that is determined as being in need of a delivery in the near future, and units equipped with tank monitors triggered an alert on this condition.

A low tank alert was typically assigned as the volume for three to four days supply of chemical usage remaining. A critical low alert level corresponded to conditions where only two days supply of remained. A dry condition was reached when the system was unable to pump any more agent.

With the database using the logic described above, it became possible for a reasonably accurate rate of product usage to be calculated for the entire storage tank population. However, the serious logistical issues of scheduling delivery dates, determining efficient delivery routes and minimizing short-notice requests for tank fills remained. This led to the development of the chemical delivery scheduler. This is part of the database that auto-populated a calendar with upcoming chemical deliveries.

The system then tracked the usage rates of all sites and populated a calendar with chemical fill dates based on calculated rates. As new tank data was entered, the requested fill date is continually adjusted to reflect the best estimate of the actual product usage. These auto-populated entries were approved by a responsible party for delivery scheduling.

The fill request dates were color coded so that they could be organized and scheduled, modified, and/or confirmed. Once the dates are confirmed, they were entered into the actual delivery queue schedule.

Example 2

A controller in accordance with the invention was installed at a first trial site in Manatee County, Florida. Liquid and vapor phase testing was done prior to and following the installation to monitor the effectiveness of the controller.

The site utilized BIOXIDE® odor control solution at a rate of about 122 gallons per day to a 3,600 foot long forcemain with an 8 inch diameter, terminating at the monitoring point. FIG. 4 shows the comparative performance of two days of treatment, one before the control system was installed, and with a daily average of about 20.6 ppm hydrogen sulfide concentration; and one after the control system was installation with an average $H_2S$ concentration of about 8.0 ppm. The feed of BIOXIDE® solution remained at about 122 gallons per day for both days.

The advance dose control system utilized 24 daily set points, correlating to each hour, entered by hand and linearly interpolated between each set point to create a smooth curve. This smooth curve provided a more accurate dosing of chemical to meet demand. The control system was capable of using different set points for each day of the week. This configuration allowed a total of 168 different possible set points. The control system used a two pump system, either variable or fixed speed. Field Testing began on Jun. 13, 2005 at two lift stations in Manatee County, a feed point and a monitoring point. Preliminary testing consisted of liquid and vapor phase data collection at both the feed point and a monitoring point. The atmospheric data used in the case study was collected at the monitoring point.

Liquid phase testing was performed at the feed point of a 3,600 foot long forcemain with an 8 inch diameter, terminating at the monitoring point. The feed point was dosing BIOXIDE® solution at approximately 122 gallons per day. Data was collected for 18 days prior to the installation of the new control system.

After installation of the control system, the daily target feed rate of BIOXIDE® solution remained at approximately 122 gallons per day. After new set points were entered on Jul. 14, 2005, the dosing profile curve stayed the same and the global factor was the only experimental parameter changed. The global factor was a parameter that multiplies the existing dosing set points and allows the feed for the entire week to be reduced or increased uniformly by a single factor creating 168 adjusted set points. In this trial the global factor was used in order to have a standardized reduction of the agent feed.

Prior to the installation of the control system, preliminary testing was performed at both a feed point and a monitoring point.

Figure 5A:
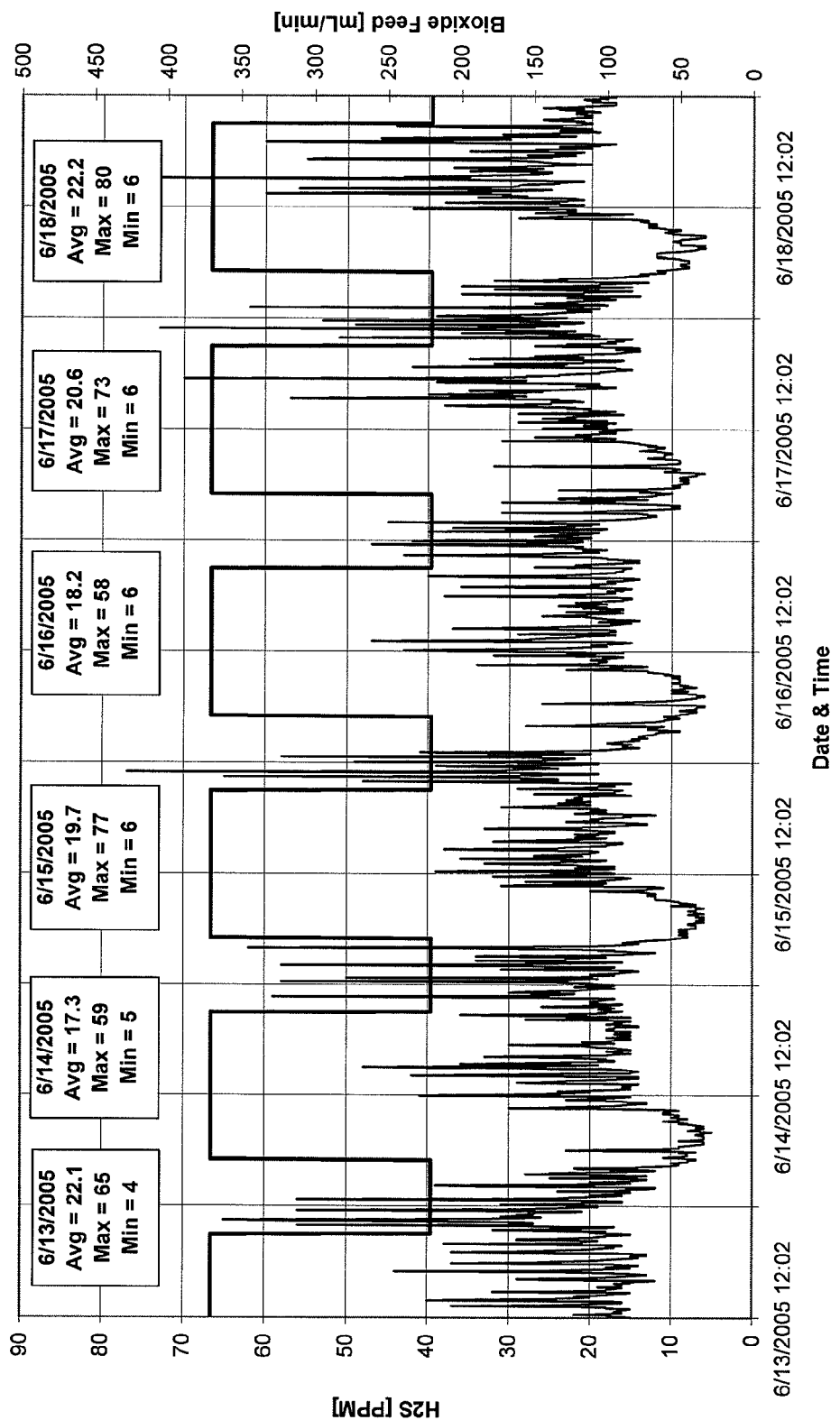
FIG. 5A is a graph showing the gas-phase $H_2S$ concentration characteristics in a sewage collection system without utilizing the control systems and techniques of the invention.

The data in FIG. 5A shows the atmospheric hydrogen sulfide concentration during a week of preliminary testing. FIG. 5A shows the hydrogen sulfide concentrations in parts per million or ppm that were present at the monitoring point.

In each of the graphs the averages for each day as well as the maximum and minimum are shown above each day on the graph, all in units of ppm $H_2S$. Averages for the preliminary testing phase ranged from approximately 17 to about 23 ppm, with an approximate mean of about 20 ppm. Also shown in FIG. 5A is the feed of BIOXIDE® solution as being fed according to the standard chemical feed system previously in place which utilized two fixed speed pumps and two timers. Peaks of approximately 105-110 ppm and an average of approximately 52 ppm of hydrogen sulfide were noted when no BIOXIDE® solution was used.

Figure 5B:
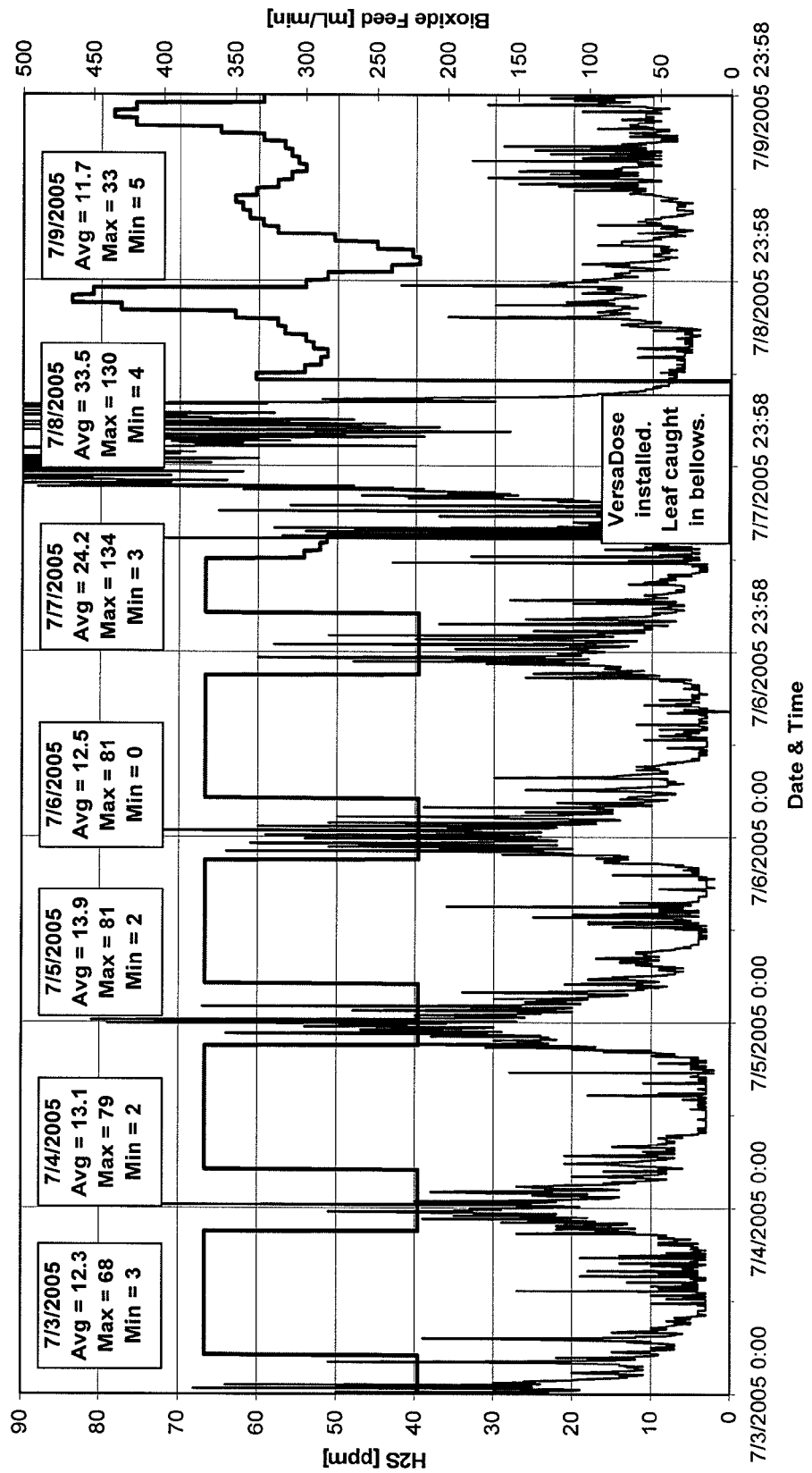
FIG. 5B is a graph showing the gas-phase $H_2S$ concentration characteristics in the sewage collection system as in FIG. 5A utilizing one or more embodiments of the control systems and techniques of the invention.

Installation of the control system occurred on Jul. 7, 2005. In FIG. 5B, which shows the week of the installation of the control system, the spike observed in hydrogen sulfide is believed to be due to the fact that a leaf was caught in the newly installed bellows-type pump and caused a dosing failure.

FIG. 5B shows a noticeable drop in the daily average of $H_2S$ on July 9, the first full day of dose on demand control. FIG. 5B also shows a drop in the maximum peak compared to the same day before the control system installation.

Figure 5C:
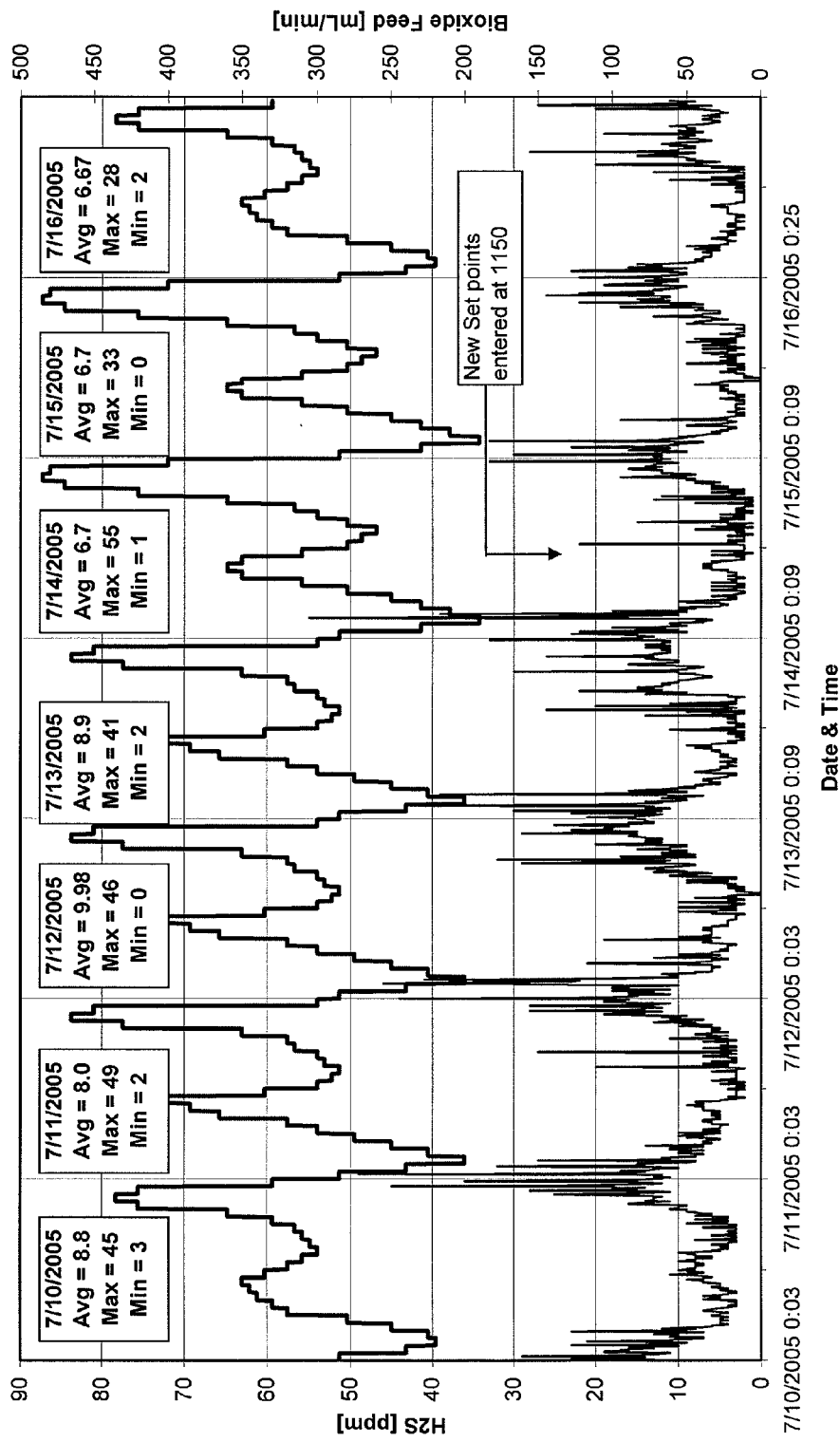
FIGS. 5C to 5E are graphs showing the gas-phase $H_2S$ concentration characteristics in the sewage collection system as in FIG. 5B utilizing BIOXIDE® solution as a treating agent another embodiment of the control systems and techniques of the invention under various adjustment factors.

FIG. 5C shows a week of data collected after installation of the control system. As shown in the graph, the BIOXIDE® solution was dosed on a curve utilizing 24 different set points for each day. This site had the same dosing profile for Monday through Friday and a different profile for Saturday and Sunday of any given week. On July 14, at about 1150, the dosing set points were changed for Monday through Friday. The daily dose of BIOXIDE® solution was kept at about 122 gallons per day. As shown in the next graph the daily average $H_2S$ concentration now ranged from about 6 to about 10 ppm with a mean of about 8 ppm. Also observed was an about 2 to 3 ppm drop in the daily averages after the modified set points were utilized on July 14.

Figure 5D:
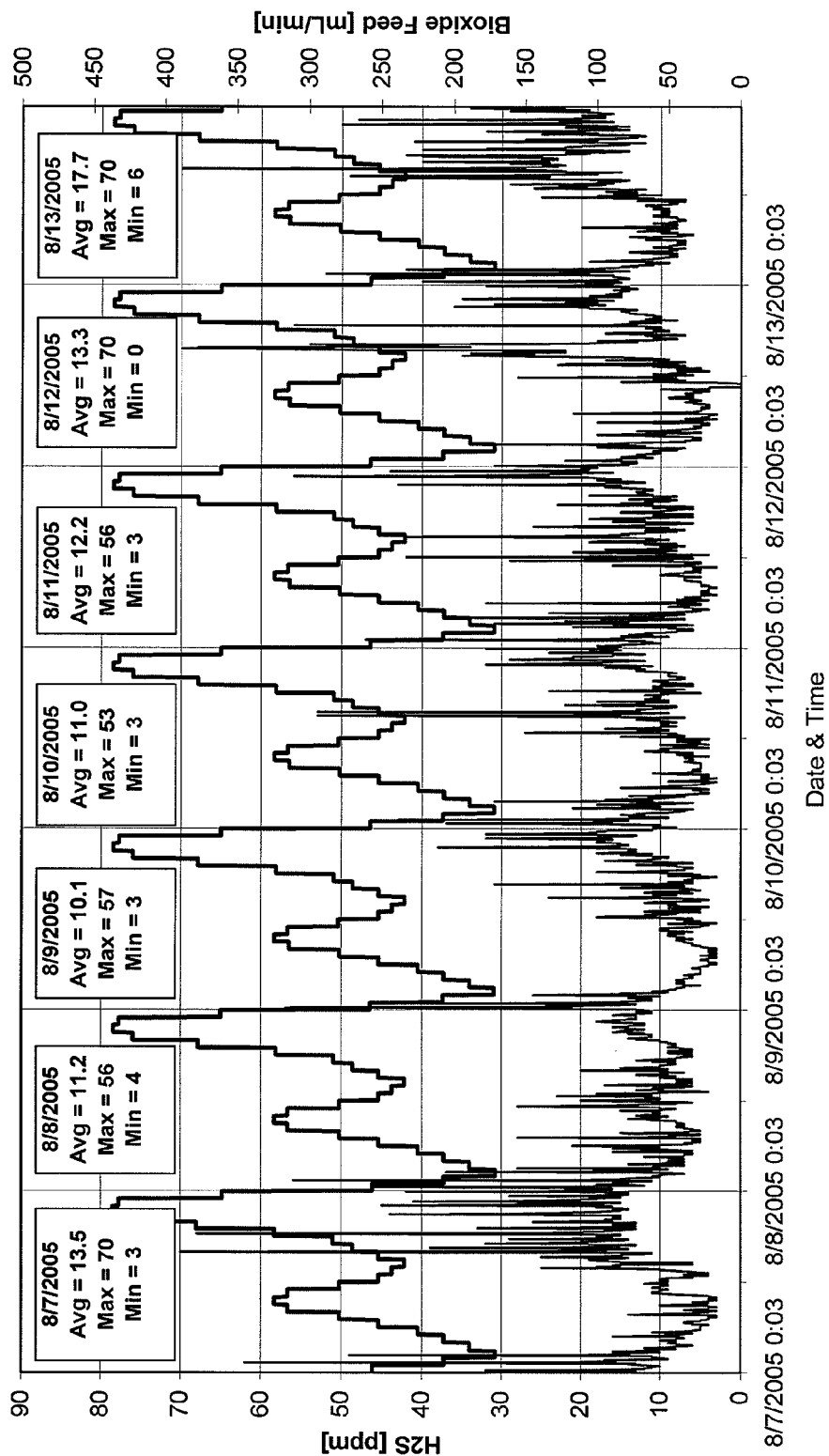

A global factor was used to change to set points by about 90%. The dosing curves as entered earlier were kept in place and only the global factor was changed. This global factor served as a multiplier in conjunction with the dosing set points to create new adjusted set points. The control system dosing adjusted set points changed to the total of agent dosage to about 109 gallons per day during the period. As shown in FIG. 5D, the daily average $H_2S$ concentration for the period following the reduction of the global factor are in the range of about 10 to about 18 ppm, with an approximate mean of about 13 ppm.

Figure 5E:
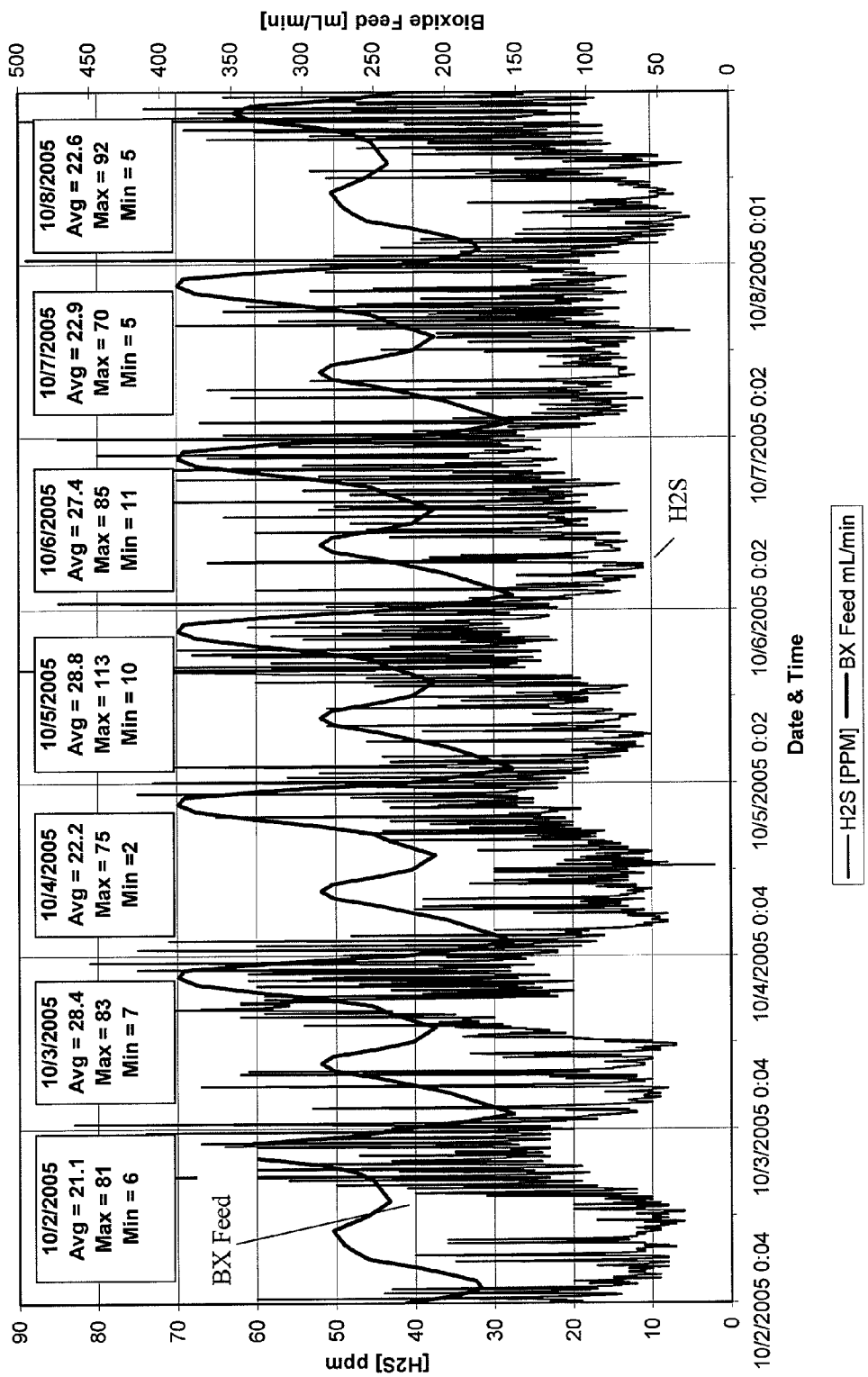

After a period of data collection with the global factor set to about 90% the global factor was then lowered to 85% of the original set points. FIG. 5E shows the hydrogen sulfide concentration data from August 28 through September 4 in this configuration. FIG. 5E shows that the average $H_2S$ concentration for the time period when the global factor was about 80% was about 24 ppm hydrogen sulfide. The average peak $H_2S$ concentration was about 85 ppm.

Table 1, below, summarizes the results.

TABLE 1

| Date | Controller | BIOXIDE® solution GPD | Average $H_2S$ Concentration ppm | Peak $H_2S$ ppm |
|---|---|---|---|---|
| 6/13-6/18 | Two pump - Two Timer | 122 | 20 | 80 |
| 7/10-7/17 | Advanced Dose Control | 122 | 8 | 55 |
| 8/7-8/13 | Advanced Dose Control | 110 | 13 | 70 |
| 8/28-9/4 | Advanced Dose Control | 104 | 16 | 84 |
| 10/2-10/8 | Advanced Dose Control | 97 | 24 | 85 |
| 7/26-7/27 | No Feed | 0 | 52 | 106 |

The data shows that daily averages fell to half those of the averages from the period before the control system of the invention was installed. There was also a lowering of the daily $H_2S$ concentration peaks which, before installation ranged between about 60 to about 80 ppm and after installation was in a range of about 30 to about 50 ppm.

This trial established that when the dosing curve remained unchanged but the global factor was reduced, resulting in less agent consumption, the daily average hydrogen sulfide concentrations were still below those before installation.

Feeding based on about 85% of the original dosing profile, the daily average $H_2S$ concentrations were still below the daily averages before the installation of the control system of the invention. This shows that the control system of the invention can reduce chemical feed by at least 15%, in some cases.

Before the control system was installed, about 122 gallons of BIOXIDE® solution was being dosed to the lift station and the daily average $H_2S$ concentrations were approximately 18 to about 22 ppm. After the control system of the invention was installed and a global factor of 85% was set, the system was dosing about 104 gallons of BIOXIDE® solution and the daily average $H_2S$ concentrations were about 14 to about 18 ppm.

As shown in Table 1, the average hydrogen sulfide concentration was reduced significantly with the implementation of the control system of the invention. The system even showed an improvement from prior to the configuration while dosing only about 85% of the original rate. When the target BIOXIDE® solution feed was furthered lowered to about 80% of the original value, the weekly average $H_2S$ concentration rose to about 24 ppm with an average peak of about 85 ppm. Further, the feed rate was lowered to about 97 gallons per day with comparable results. This illustrates that using the control system of the invention can reduce chemical feed by at least about 15% to about 20% while maintaining comparable performance.

Example 3

The advanced dose control system of the invention was installed at another facility using 24 daily set points loaded into the controller or 168 different set points for the week. The control system interpolated between each set point to create the dosing curve. This trial site was performed at a lift station in Southwest Florida. The site originally used ODOPHOS® solution as treating agent at about 130 gallons per day into a sixty-foot long gravity main, terminating at the monitoring point.

Figure 6A:
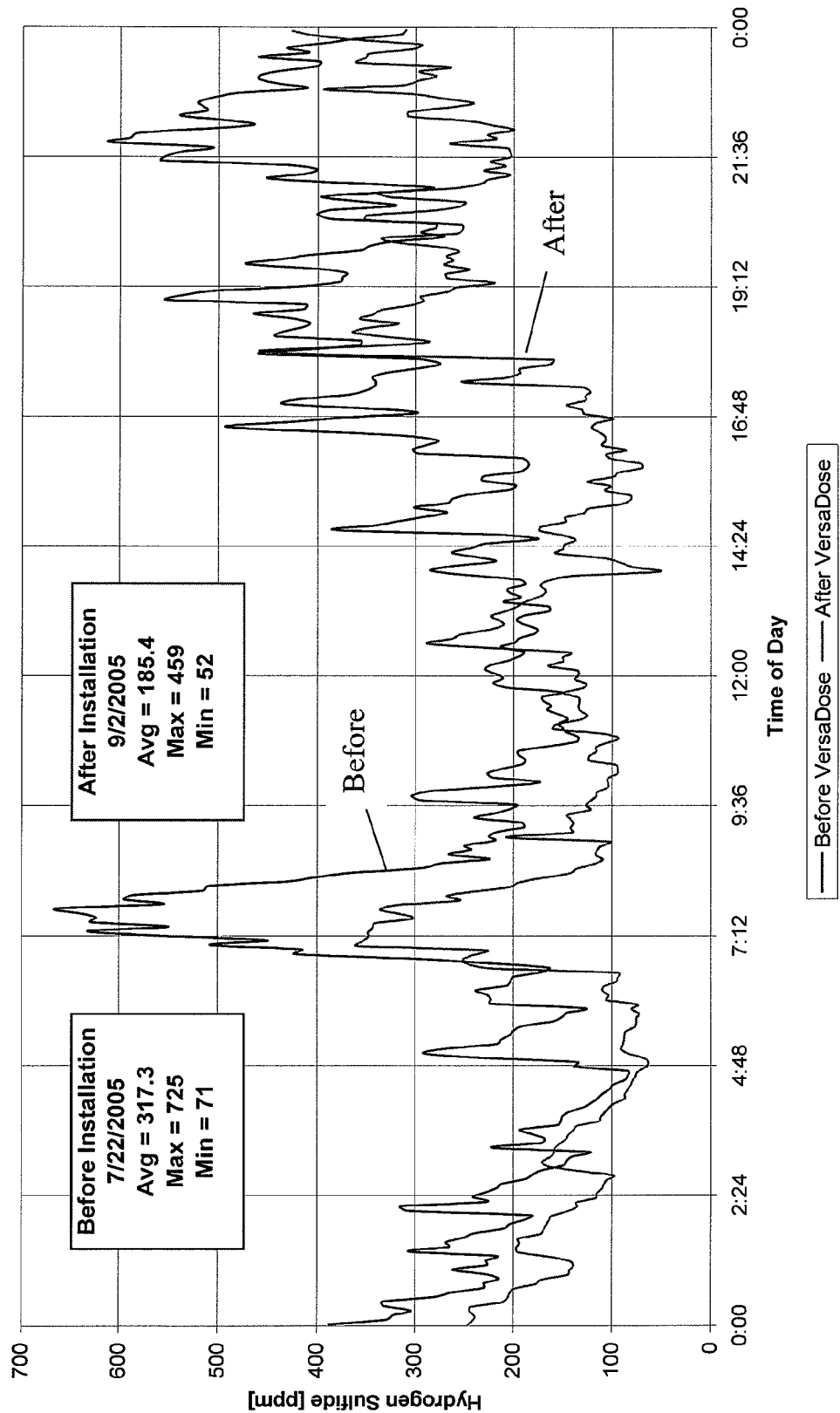
FIGS. 6A to 6F are graphs showing the gas-phase $H_2S$ concentration in a sewage collection system utilizing ODOPHOS® solution as a treating agent, with and without the advanced dose control system of the invention.

FIG. 6A is a graph comparatively illustrating the atmospheric data of hydrogen sulfide before and after the installation of the control system of the invention. Both days shown are Fridays, the "Before" average $H_2S$ concentration was about 296.7 ppm, with a maximum of about 664 ppm. After the control system of the invention was installed, the average $H_2S$ concentration was about 185.4 ppm, with a maximum of about 459 ppm. The ODOPHOS® solution before installation was introduced at a constant rate of about 340 mL/min, about 130 gallons per day. After the installation of the control system, about 130 gallons per day of ODOPHOS® solution was based on a demand curve.

The controller utilized 24 daily set points, correlating to each hour, entered by the operator. The controller linearly interpolated between each set point to simulate a smooth dosing curve. The controller was also capable of using different set points for each day of the week; this configuration provided a total of 168 different possible set points.

The control system used a two pump system, either variable or fixed speed. Field testing began Jul. 1, 2005 at a lift station. Testing was performed at both a feed point and a monitoring point.

Preliminary testing consisted of liquid and vapor phase data collection at both the feed point and a monitoring point. The atmospheric data used in the study was collected at the monitoring point. The monitoring point was approximately 50 feet from the point where the ODOPHOS® solution was introduced. The 60 foot gravity main terminated at the monitoring point. The gravity main emptied into the lift station, where monitoring of both liquid and vapor phases occurred.

Figure 6B:
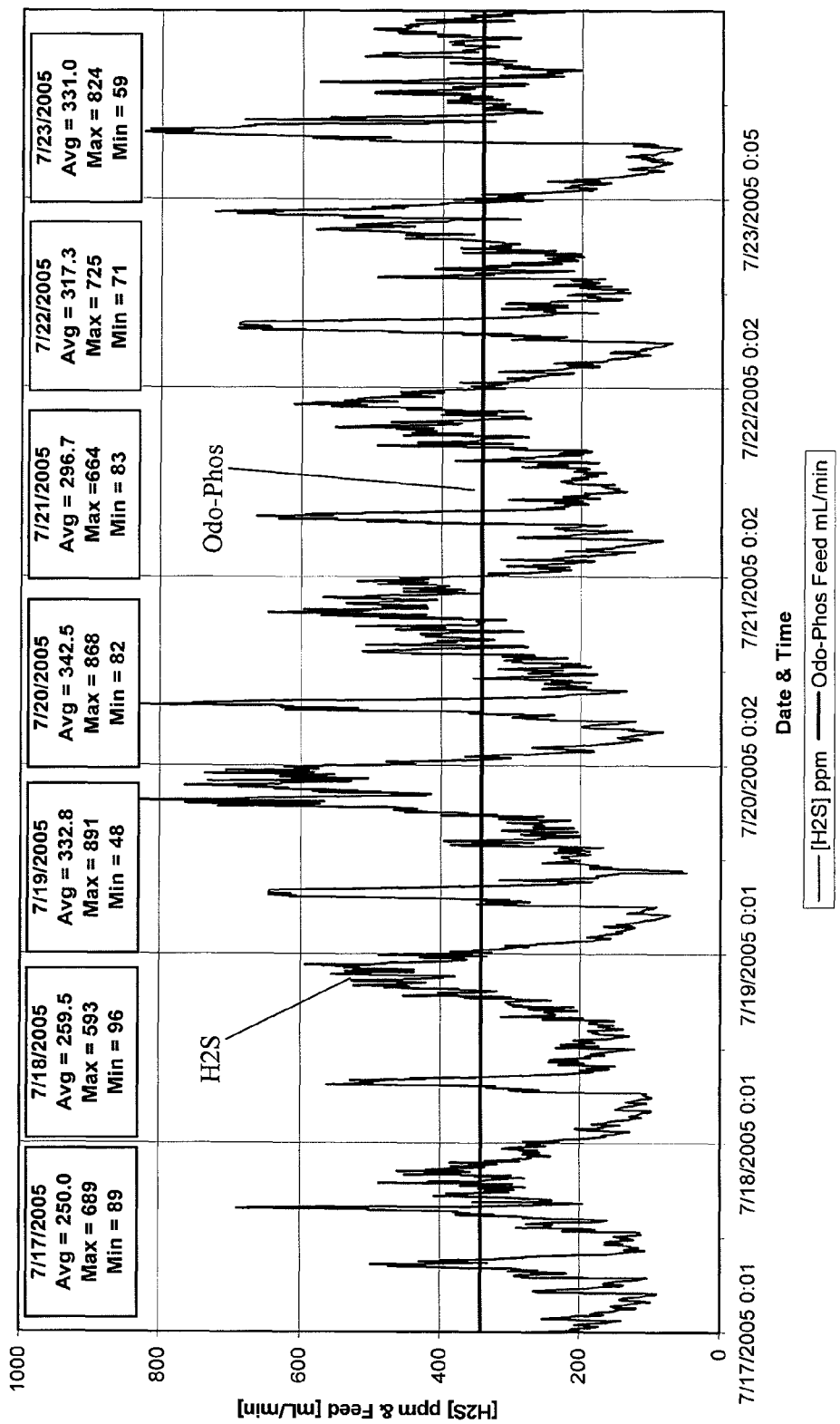

Prior to the controller installation, ODOPHOS® solution was being fed at a rate of about 130 gallons per day. The rate was constant 24 hours a day, as shown in FIG. 6B, a rate of about 340 mL/min. FIG. 6B shows the hydrogen sulfide concentrations gathered from the monitoring point for the trial for the week before the installation. The weekly average hydrogen sulfide concentration was approximately 304 ppm, with an average peak concentration of about 751 ppm. A diurnal pattern is observed in the figure.

Figure 6C:
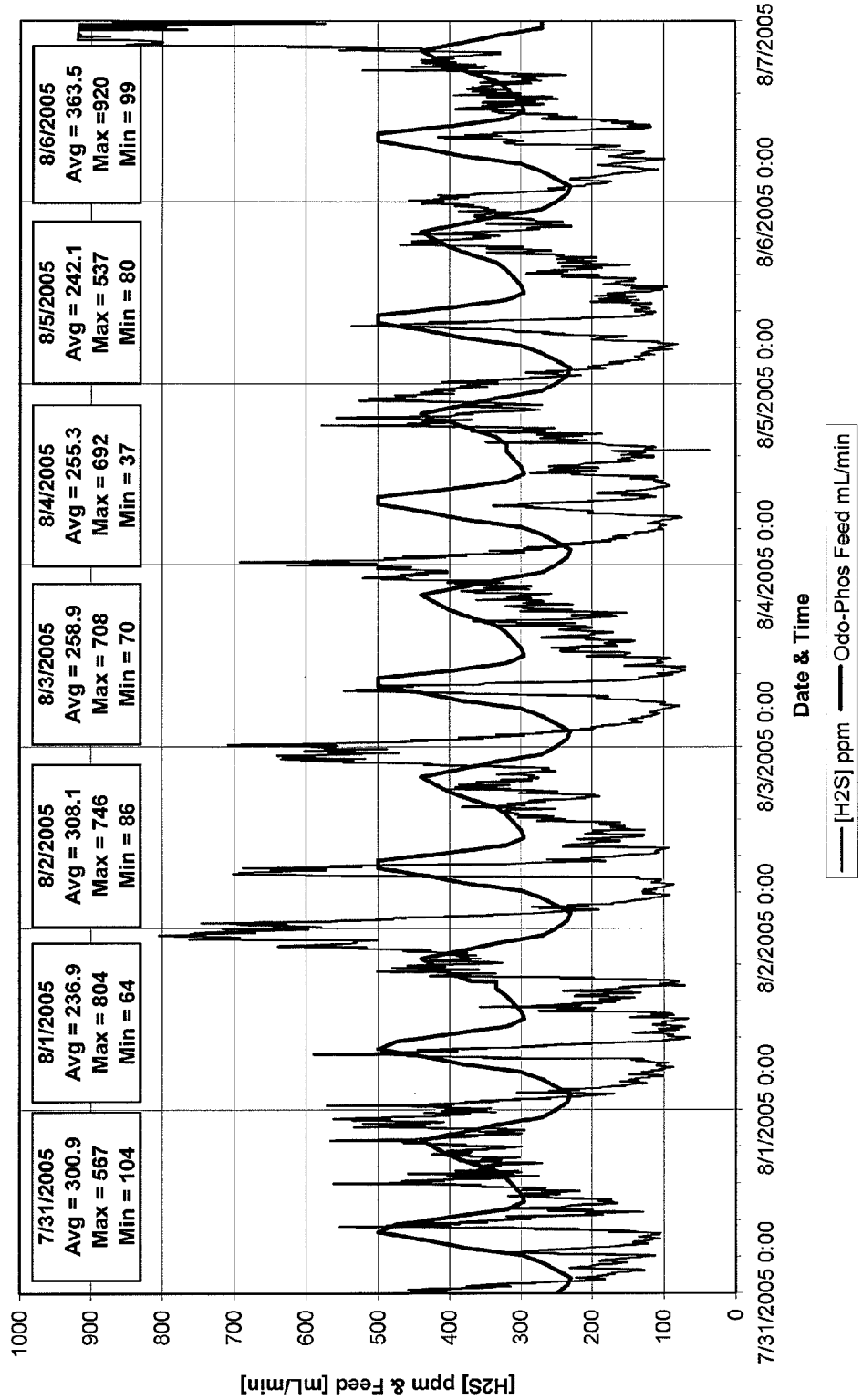

The control system of the invention was installed on Jul. 27, 2005. Dosing set points were entered according to a profile calculated using the system characteristics. The total ODOPHOS® solution remained at about 130 gallons per day. The rate, however, varied by the time of day according to the dose to demand curve. The same profile was used for each day. FIG. 6C is graph depicting the average hydrogen sulfide data from the monitoring point after the installation of the controller. During the first full week following the installation of the controller, the atmospheric data showed an average hydrogen sulfide concentration of about 278.5 ppm and an average peak hydrogen sulfide concentration of about 621.8 ppm.

Figure 6D:
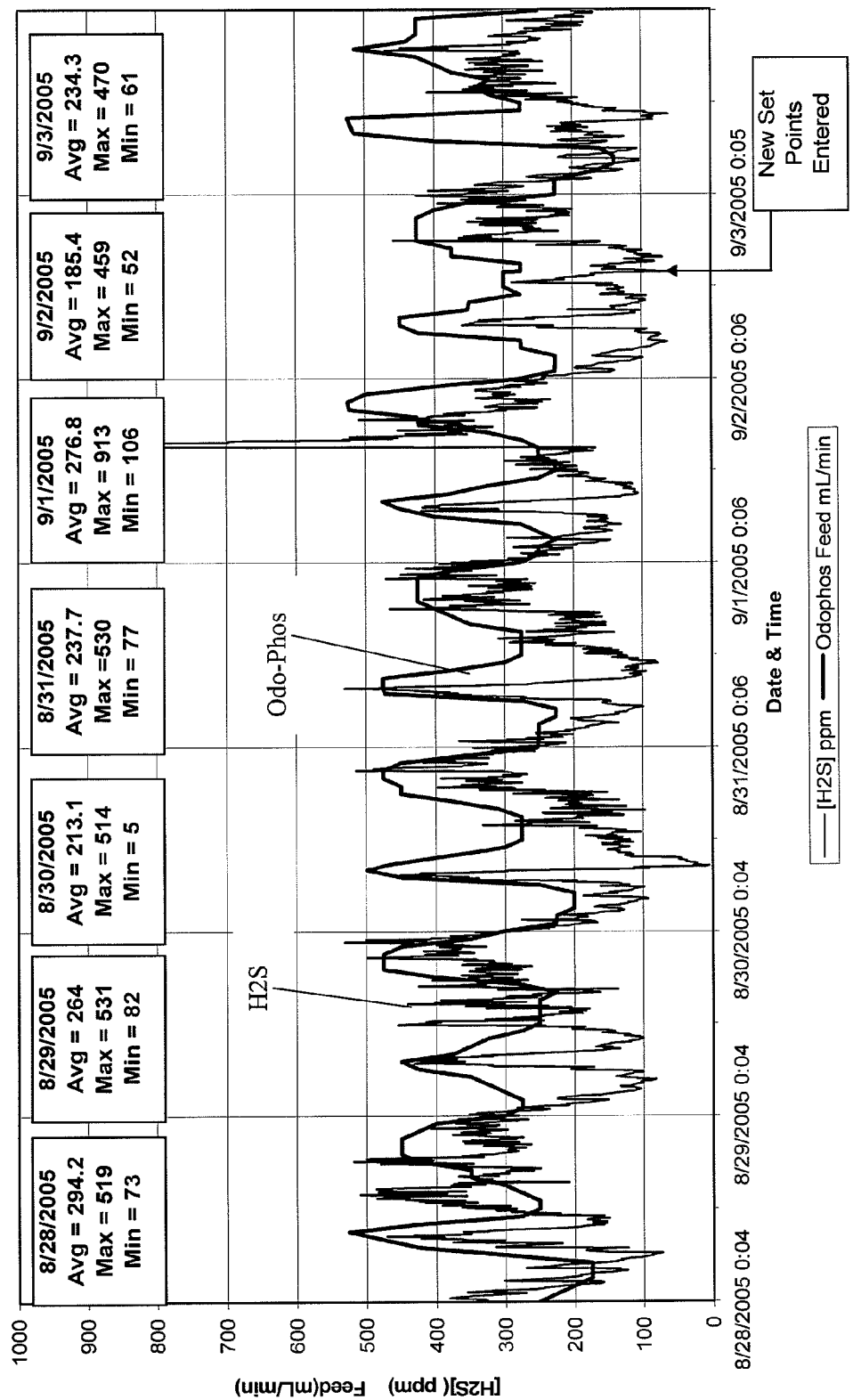

FIG. 6D shows data collected during the week of Aug. 28 through Sep. 3, 2005. During this week new feed rates were entered into the controller, altering the curve slightly in order to optimize the system to reduce the peaks and the lower of the average daily levels of hydrogen sulfide. The amount of ODOPHOS® solution remained the same. The only change made to the system was the shape of the dosing curve. As shown, the week of August 21 has a weekly average hydrogen sulfide level of about 243 ppm and an average maximum hydrogen sulfide concentration of about 562 ppm.

Figure 6E:
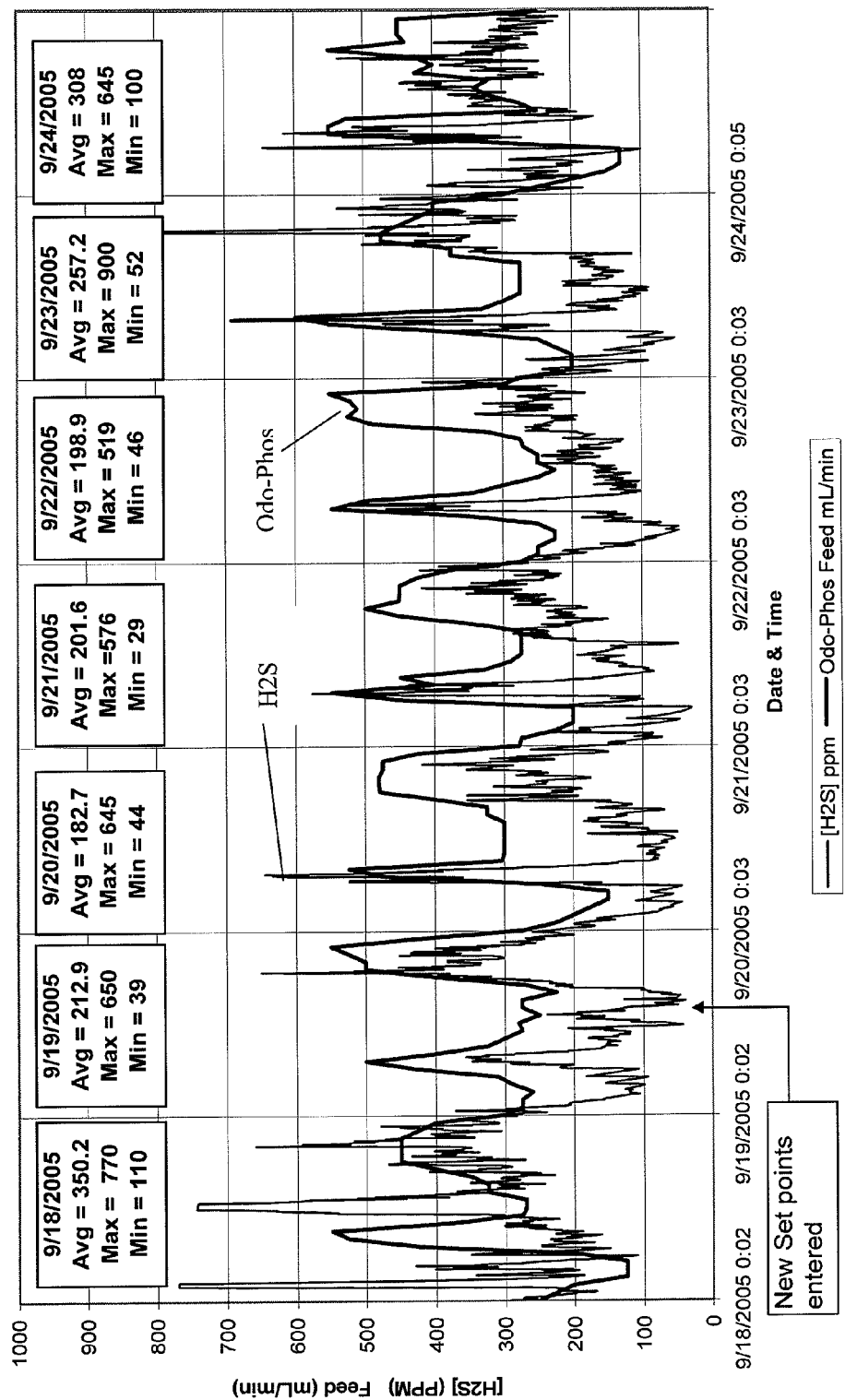

FIG. 6E shows the results of the week of September 18$^{th}$ through the 24$^{th}$ during which new set points were entered into the controller to further optimize the system. The retention time from the feed point to the monitoring point was virtually zero and was considered negligible for the purpose of optimization. Through the process of optimization, it was found that each day of the week had a different set of dosing set points and thus a different curve. This process utilized the controller's ability to dose 168 weekly set points.

The average hydrogen sulfide concentration after the new set points were entered was approximately 244 ppm and the average peak hydrogen sulfide concentration for the week was about 672 ppm. This average peak included the abnormal peak of 900 ppm hydrogen sulfide on September 23.

Figure 6F:
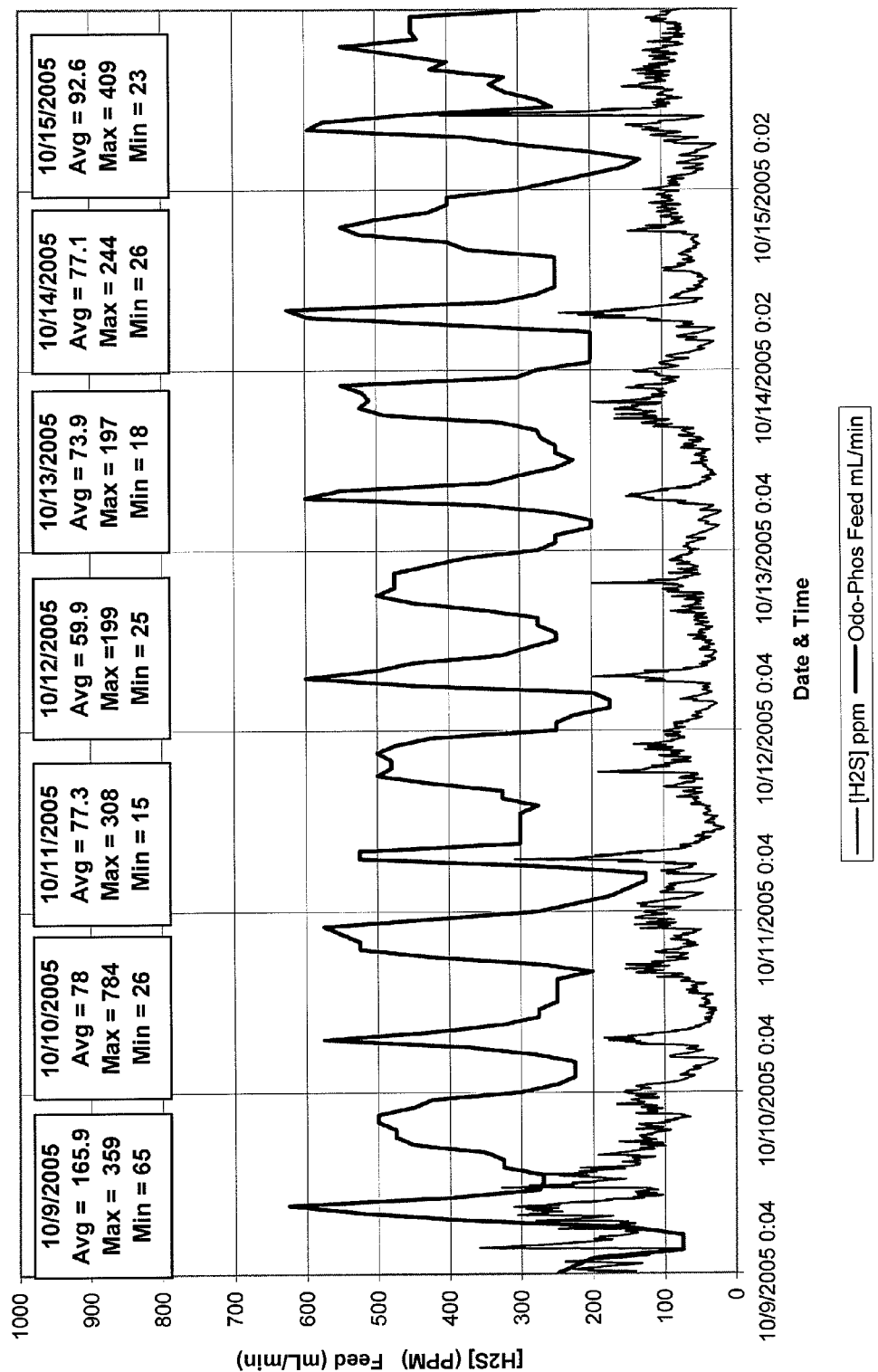

FIG. 6F shows further optimization of the system at a second site. New set points were previously entered on September 29. The graph represents the atmospheric data from the week of October 9$^{th}$ after the new set points were entered. The hydrogen sulfide concentration average for the week, including before and after the new set points, was approximately 89 ppm and the average daily peak for the week was about 357 ppm. The ODOPHOS® solution feed rate remained about 130 gallons per day.

After the installation of the control system of the invention, the hydrogen sulfide levels for the week after the installation compared with the week directly preceding the installation illustrated a reduction in the average daily average concentration of approximately 8%. After optimization of the system a drop of about 20% was demonstrated. These data is also presented in Table 2 below. The reduction was realized by utilizing the dose on demand approach of the invention.

TABLE 2

| Date | Controller | ODOPHOS ® Solution Feed (GPD) | Average H$_2$S concentration ppm | Average Peak H$_2$S concentration Ppm |
|---|---|---|---|---|
| Jul. 17, 2005-Jul. 23, 2005 | None | 130 | 304.3 | 750.6 |
| Jul. 31, 2005-Aug. 6, 2005 | Advanced Dose Control | 130 | 278.5 | 621.8 |
| Aug. 28, 2005-Sep. 3, 2005 | Advanced Dose Control* | 130 | 243.6 | 562.3 |
| Sep. 18, 2005-Sep. 24, 2005 | Advanced Dose Control* | 130 | 244.4 | 672 |
| Oct. 9, 2005-Oct. 15, 2005 | Advanced Dose Control* | 130 | 89.2 | 357.4 |

The average hydrogen sulfide concentrations decreased after the controller was installed and the peak concentrations also decreased, in magnitude and frequency. After further optimization the average concentration continued to decrease.

The trial at the second site shows the ability of the advanced dose controller to reduce the hydrogen sulfide in a system when utilizing dosing on a curve or demand of the invention.

Having now described some illustrative embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Further, acts, elements, and features discussed only in connection with one embodiment are not intended to be excluded from a similar role in other embodiments.

It is to be appreciated that various alterations, modifications, and improvements can readily occur to those skilled in the art and that such alterations, modifications, and improvements are intended to be part of the disclosure and within the spirit and scope of the invention. Indeed, the invention contemplates retrofitting or otherwise modifying existing facilities to perform one or more aspects of the invention.

Moreover, it should also be appreciated that the invention is directed to each feature, system, subsystem, or technique described herein and any combination of two or more features, systems, subsystems, or techniques described herein and any combination of two or more features, systems, subsystems, and/or methods, if such features, systems, subsystems, and techniques are not mutually inconsistent, is considered to be within the scope of the invention as embodied in the claims.

Those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is therefore to be understood that the embodiments described herein are presented by way of example only and that, within the scope of the appended claims and equivalents thereto; the invention may be practiced otherwise than as specifically described.

Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims.

What is claimed is:

1. A chemical feed system comprising:
a sensor disposed to measure a first parameter of a fluid and to transmit a first measurement signal corresponding to the first parameter;
a source of a treating agent disposed to introduce at least one treating agent into the fluid; and
a controller in communication with the sensor and the source of the treating agent, the controller configured to receive the first measurement signal from the sensor and a second measurement signal corresponding to a measured parameter of the source of the treating agent, and further configured to transmit to the source of the treating agent at least one control signal based at least in part on a control function and the first measurement signal, and also further configured to generate an expected characteristic value of the source of the treating agent based at least in part on the at least one control signal.

2. The system of claim 1, wherein the control function comprises an array of demand values.

3. The system of claim 2, wherein the measured first parameter is representative of a concentration of an odorous species in the fluid.

4. The system of claim 3, wherein the controller is further configured to receive the second measurement signal and generate a measured characteristic value of at least one operating parameter of the source of the treating agent.

5. The system of claim 4, wherein the controller is further configured to determine a relative characteristic value based on the difference between the measured characteristic value and the expected characteristic value.

6. The system of claim 5, further comprising at least one output device in communication with the controller.

7. The system of claim 6, wherein the controller is configured to generate an output signal based on the relative characteristic value and transmit the output signal to the at least one output device.

8. The system of claim 7, further comprising a flow sensor disposed to measure a flow rate of at least one phase of the fluid and transmit a corresponding measured flow value.

9. The system of claim 8, wherein the controller is further configured to generate a composite average flow curve based on the measured flow value.

10. The system of claim 9, wherein the controller is further configured to identify a triggering condition based on the composite average flow curve and a currently measured flow value.

11. The system of claim 10, wherein the triggering condition is realized when a difference between the composite average flow curve and the currently measured flow value exceeds a predetermined tolerance value.

12. The system of claim 11, wherein the controller is further configured to adjust the control signal based on the triggering condition.

13. The system of claim 11, wherein the triggering condition is indicative of a rainfall event.

14. The system of claim 2, further comprising at least one input device in communication with the controller and configured to receive at least one demand value.

15. The system of claim 1, wherein the control signal comprises at least one active component and at least one dormant component.

16. The system of claim 15, wherein the magnitude of the active component is proportionally based on the difference between the first measured parameter and a corresponding demand value.

17. The system of claim 1, wherein the control signal is at least partially based on the difference between the first measured parameter and a corresponding demand value.

18. The system of claim 1, wherein the control signal is at least partially defined as an active component of a duty cycle period.

19. The system of claim 1, wherein the sensor is remotely disposed from a point of introduction of the treating agent into the fluid.

20. The system of claim 1, wherein the treating agent comprises at least one of a nitrate containing species and an alkaline material.

* * * * *